US010735404B2

(12) United States Patent
Cicchitto et al.

(10) Patent No.: US 10,735,404 B2
(45) Date of Patent: Aug. 4, 2020

(54) AGGREGATOR TECHNOLOGY WITHOUT USERNAMES AND PASSWORDS IMPLEMENTED IN A SERVICE STORE

(71) Applicant: Avatier Corporation, Pleasanton, CA (US)

(72) Inventors: Nelson A. Cicchitto, San Ramon, CA (US); Anthony R. T. Simmons, Concord, CA (US)

(73) Assignee: Avatier Corporation, Pleasanton, CA (US)

( * ) Notice: Subject to any disclaimer, the term of this patent is extended or adjusted under 35 U.S.C. 154(b) by 183 days.

(21) Appl. No.: 15/826,514

(22) Filed: Nov. 29, 2017

(65) Prior Publication Data

US 2018/0083951 A1 Mar. 22, 2018

Related U.S. Application Data

(60) Continuation-in-part of application No. 15/626,997, filed on Jun. 19, 2017, now Pat. No. 9,979,715, which is a division of application No. 15/052,747, filed on Feb. 24, 2016, now Pat. No. 9,686,273.

(60) Provisional application No. 62/120,153, filed on Feb. 24, 2015, provisional application No. 62/427,662, filed on Nov. 29, 2016.

(51) Int. Cl.
*H04L 29/06* (2006.01)
*G06F 21/32* (2013.01)
*G06F 21/41* (2013.01)

(52) U.S. Cl.
CPC ............ *H04L 63/083* (2013.01); *G06F 21/32* (2013.01); *G06F 21/41* (2013.01); *H04L 63/0815* (2013.01)

(58) Field of Classification Search
CPC ... H04L 63/083; H04L 63/0815; G06F 21/41; G06F 21/32
USPC .......................................................... 726/6
See application file for complete search history.

(56) References Cited

U.S. PATENT DOCUMENTS

| 5,446,891 A | 8/1995 | Kaplan et al. |
|---|---|---|
| 7,103,666 B2 | 9/2006 | Royer et al. |
| 7,346,923 B2 | 3/2008 | Atkins et al. |
| 7,536,389 B1 | 5/2009 | Prabhakar et al. |
| 8,073,810 B2 | 12/2011 | Maes et al. |
| 8,533,773 B2 | 9/2013 | Maes et al. |
| 8,589,338 B2 | 11/2013 | Maes et al. |

(Continued)

FOREIGN PATENT DOCUMENTS

EP 1089516 A3 8/2002

OTHER PUBLICATIONS

Grassi, Paul A. et al., "Digital Identity Guidelines", NIST Special Publication 800-63A, Jun. 2017, 1-32.

(Continued)

*Primary Examiner* — Aravind K Moorthy
(74) *Attorney, Agent, or Firm* — Perkins Coie LLP; Michael Glenn

(57) ABSTRACT

Techniques are described in which a service store is provided that allows consumers to shop for services online. The service store system architecture includes a service store which interacts over a network with service consumers, service providers, a social single sign-on aggregated identity engine, and various external partners. Through the online service store, complex and customized ordering and fulfillment processes are achieved using the service store environment.

20 Claims, 27 Drawing Sheets

(56) References Cited

U.S. PATENT DOCUMENTS

| | | |
|---|---|---|
| 9,037,864 B1 | 5/2015 | Staddon et al. |
| 9,449,258 B1 | 9/2016 | Palacio et al. |
| 9,686,273 B2 | 6/2017 | Cicchitto et al. |
| 9,838,260 B1 | 12/2017 | McClintock |
| 9,979,715 B2 | 5/2018 | Cicchitto et al. |
| 2003/0065919 A1 | 4/2003 | Albert et al. |
| 2003/0074326 A1* | 4/2003 | Byers .................. G06F 21/32 705/64 |
| 2003/0163738 A1 | 8/2003 | Couillard et al. |
| 2003/0217148 A1 | 11/2003 | Mullen et al. |
| 2004/0128546 A1 | 7/2004 | Blakley et al. |
| 2005/0238159 A1 | 10/2005 | Halsell et al. |
| 2006/0136731 A1* | 6/2006 | Hicks .................... G06F 9/451 713/176 |
| 2008/0134305 A1 | 6/2008 | Hinton et al. |
| 2008/0216153 A1* | 9/2008 | Aaltonen ............... G06F 21/31 726/3 |
| 2008/0289006 A1 | 11/2008 | Hock et al. |
| 2009/0006195 A1 | 1/2009 | Rosen et al. |
| 2009/0017847 A1 | 1/2009 | Mendiola et al. |
| 2009/0292814 A1* | 11/2009 | Ting .................... G06F 15/16 709/229 |
| 2011/0016322 A1* | 1/2011 | Dean .................. H04L 9/0844 713/171 |
| 2011/0314515 A1 | 12/2011 | Hernoud et al. |
| 2013/0219473 A1* | 8/2013 | Schaefer ............. G06F 21/335 726/4 |
| 2013/0263021 A1 | 10/2013 | Dunn et al. |
| 2013/0290475 A1 | 10/2013 | Flagg et al. |
| 2013/0314208 A1 | 11/2013 | Risheq et al. |
| 2013/0346337 A1* | 12/2013 | O'Donnell ......... G06Q 10/0833 705/333 |
| 2014/0201806 A1 | 7/2014 | Kumar |
| 2014/0298490 A1 | 10/2014 | Clark et al. |
| 2015/0127348 A1* | 5/2015 | Follis .................... G06F 21/10 704/260 |
| 2015/0127678 A1 | 5/2015 | Alvi et al. |
| 2015/0149529 A1 | 5/2015 | Loader et al. |
| 2015/0205954 A1 | 7/2015 | Jou et al. |
| 2015/0304330 A1 | 10/2015 | Soamboonsrup et al. |
| 2016/0048662 A1 | 2/2016 | Arnoud et al. |
| 2016/0112397 A1 | 4/2016 | Mankovskii |
| 2016/0119325 A1* | 4/2016 | Doshi ................ H04L 63/0815 726/7 |
| 2016/0127367 A1 | 5/2016 | Jevans |
| 2016/0149707 A1* | 5/2016 | Follis .................. H04L 9/3247 713/176 |
| 2016/0173500 A1 | 6/2016 | Sharabi et al. |
| 2016/0202969 A1* | 7/2016 | Nachtigal ................ G06F 8/71 717/121 |
| 2016/0226911 A1 | 8/2016 | Boss et al. |
| 2016/0306965 A1 | 10/2016 | Iyer et al. |
| 2017/0118239 A1 | 4/2017 | Most et al. |
| 2017/0140312 A1 | 5/2017 | Pai et al. |
| 2017/0161503 A1 | 6/2017 | Seigel et al. |
| 2017/0195352 A1 | 7/2017 | Yishay et al. |
| 2018/0004948 A1 | 1/2018 | Martin et al. |
| 2018/0183827 A1 | 6/2018 | Zorlular et al. |
| 2018/0246567 A1* | 8/2018 | Campbell ............. G06F 3/013 |
| 2018/0293393 A1* | 10/2018 | Effendi ................ G06F 21/32 |
| 2018/0343246 A1 | 11/2018 | Benayed |

OTHER PUBLICATIONS

Grassi, Paul A. et al., "Digital Identity Guidelines", NIST Special Publication 800-63C, Jun. 2017, 1-34.

Grassi, Paul A. et al., "Digital Identity Guidelines", NIST Special Publication 800-63 Revision 3, Jun. 2017, 1-53.

Grassi, Paul A. et al., "Digital Identity Guidelines", NIST Special Publication 800-63B, Jun. 2017, 1-55.

* cited by examiner

AGGREGATOR TECHNOLOGY WITHOUT USERNAMES AND PASSWORDS IMPLEMENTED IN A SERVICE STORE

CROSS REFERENCE TO RELATED APPLICATIONS

This patent application is a continuation-in-part of copending U.S. patent application Ser. No. 15/626,997, AGGREGATOR TECHNOLOGY WITHOUT USERNAMES AND PASSWORDS, filed Jun. 19, 2017 (now U.S. Pat. No. 9,979,715), which is incorporated herein by reference in its entirety, which is a divisional of U.S. patent application Ser. No. 15/052,747 (now U.S. Pat. No. 9,686,273), AGGREGATOR TECHNOLOGY WITHOUT USERNAMES AND PASSWORDS, filed Feb. 24, 2016, which is incorporated herein by reference in its entirety, and additionally claims priority from U.S. Provisional Patent Application No. 62/120,153, SOCIAL SINGLE SIGN-ON AGGREGATOR WITHOUT USERNAMES AND PASSWORDS, filed Feb. 24, 2015, which is also incorporated herein by this reference in its entirety, and additionally claims priority from U.S. Provisional Patent Application No. 62/427,662, SERVICE STORE, filed Nov. 29, 2016, which is incorporated herein by reference in its entirety.

BACKGROUND OF THE INVENTION

Technical Field

This innovation relates generally to the field of automated identity and access management technology in a service store implementation. More specifically, this innovation relates to using aggregator technology without usernames and passwords for automating identity and access management in a service store implementation.

Background

Many organizations rely on technological identity and access management solutions to keep pace with the growth of their organizations, e.g. gaming and hospitality enterprises. Thus, for example, such organizations deploy automated user de-provisioning or password policy enforcement.

In today's environment, partner enterprises allow an external user from one organization outside of their network to have access to an internal application of their organization within their own network. This type of partnership can be referred to as federated identity management. With using federated identity management, an internal application written at Company A can be made publicly available. For a user at Company B on one type of network to access on an entirely different network the internal application written at Company A, the user has to perform the following procedure. The user creates an internal ID at Company A, enters the internal application and maps his external ID from his own network to his internal ID on Company A's network. Further, Company A can allow the user to access their internal application by the user using a social network account, such as a LinkedIn (Mountain View, Calif.; "LinkedIn") account for example. Then, Company A can link the external user's social network account sign on to Company A's internal application.

The technique described above allows Company A to manage their partners' access to their internal applications.

Today, there's a technology known as federation, which allows an enterprise to manage their partners' access to their internal applications. However, federation requires high maintenance for every partner company and a lot of initial effort to set up and configure.

With regard to current practices for a user to obtain a service, the process typically is complicated. For example, if a user needs the services of a contractor to remodel a room in a house, the user and the contractor engage in one or more careful dialogs before ultimately agreeing on the specifics that need to be done for the remodel, e.g. type of floor for a bathroom, which wall to remove to enlarge a living room, or what type of lumber to use for a replaced outdoor deck. Coming to an agreement on the specifics can typically take a number of interactions between the user and the contractor, especially when the user has questions regarding cost, scheduling, and other constraints, e.g. no work to be done on the home during weekends.

This process for providing or obtaining a service is the status quo, regardless of the environment for which the service is rendered. Examples of such environments include the gamut from the Internet for online services such as obtaining a subscription to an online blog to an enterprise provisioning information technology (IT) services such as access to an enterprise account.

SUMMARY

Techniques are described in which a service store is provided that allows consumers to shop for services online. The service store system architecture includes a service store which interacts over a network with service consumers, service providers, a social single sign-on aggregated identity engine, and various external partners. Through the online service store, complex and customized ordering and fulfillment processes are achieved using the service store environment.

BRIEF DESCRIPTION OF THE DRAWINGS

One or more embodiments of the present invention are illustrated by way of example and not limitation in the figures of the accompanying drawings.

FIG. 1 illustrates an example of an interface of a user's page of an aggregator platform, according to an embodiment;

FIG. 9 illustrates an example of a user interface of a delegation page in which a user can enter a delegation type, provider type, provider user name, applicable filters, and a selection of one or more applications to share, according to an embodiment;

FIG. 10 illustrates an example of a user interface showing a sample dropdown list of the provider types of FIG. 9, according to an embodiment;

FIG. 11 illustrates an example of a user interface showing a home page of the aggregator system, according to an embodiment;

FIG. 12 illustrates an example of two different devices, a tablet and a smartphone, each displaying the home page web page of the aggregator system, according to an embodiment;

DETAILED DESCRIPTION

Figure 2:
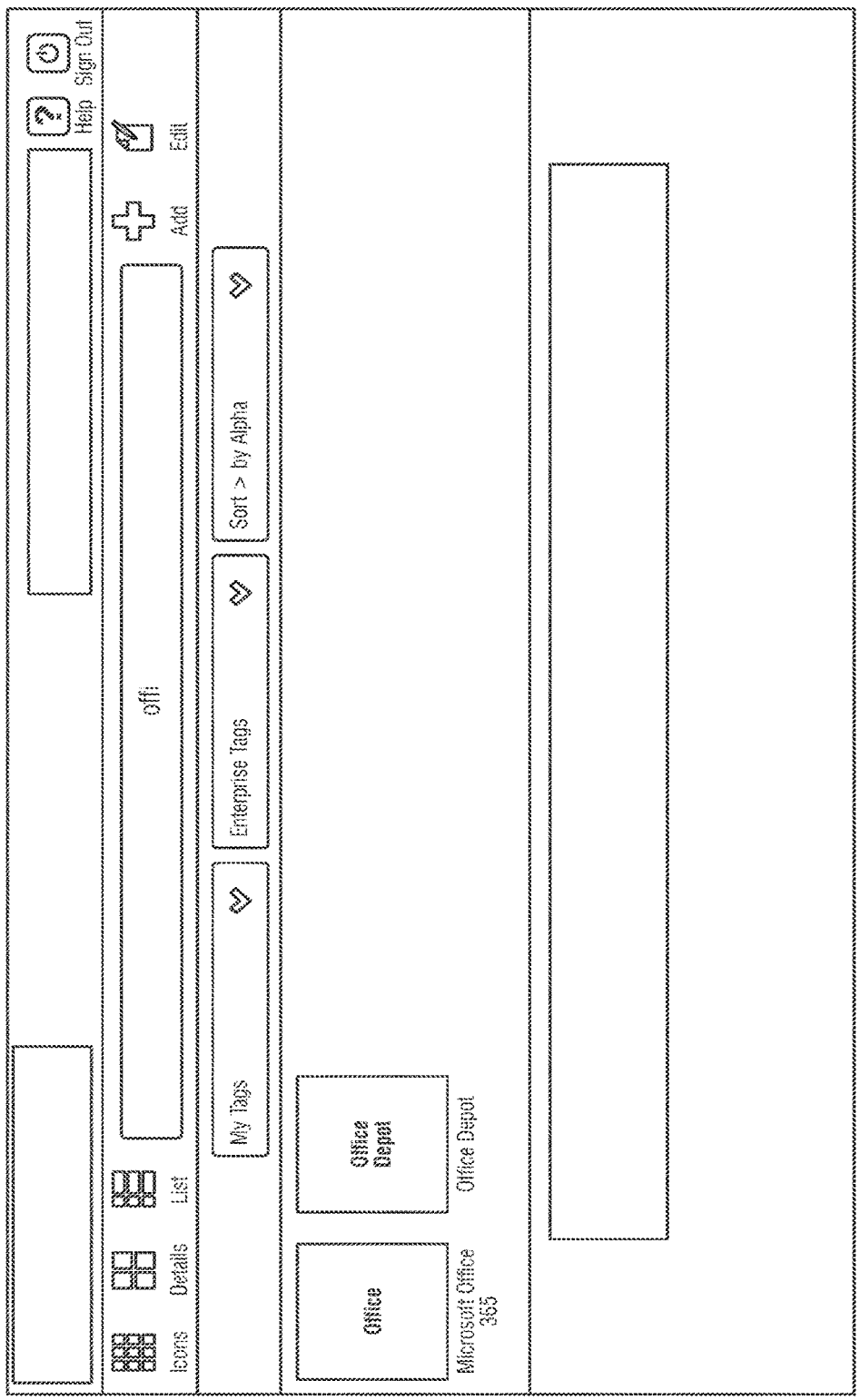
FIG. 2 illustrates an example of a user interface showing two icons representing an enabled application on the aggregator platform and a not-enabled application on the aggregator platform, according to an embodiment.

Techniques are described in which a service store is provided that allows consumers to shop for services online. The service store system architecture includes a service store which interacts over a network with service consumers, service providers, a social single sign-on aggregated identity engine, and various external partners. Through the online service store, complex and customized ordering and fulfillment processes are achieved using the service store environment.

Also introduced here is a technique with which to access a user's web applications. The user registers and signs on to an aggregator system using any supported login identity provider username and password. When the user registers for the first time, the system collects additional information to verify the user for a subsequent access to the system. The system also automatically creates an system secret username and secret, highly securely generated password, both of which are unknown and inaccessible to the user. The secret username and password are stored in an lightweight directory access protocol (LDAP) server or database or in a distributed cloud database system. The system also maps the login identity provider user name to the secret user name and password for subsequent usage.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

An Exemplary Embodiment of an Aggregator Platform without Usernames and Passwords An exemplary embodiment of an aggregator platform without usernames and passwords is a social single sign-on ("sSSO") platform. It should be appreciated that the technique discussed herein can also refer to the aggregator system or application, depending on the context of the discussion. Such platform comprises a server that aggregates a plurality of web applications both internal to an organization and that are public facing to login identity providers including social networking sites such as for example LinkedIn or Facebook (Menlo Park, Calif.; "Facebook"). The platform presents the aggregation of such web applications as links provided to a particular user.

Examples of login identity providers include but are not limited to social networking sites, Linkedin and Facebook. A sample non-exhaustive list can be found in FIG. 4, which is described in further detail below.

Figure 1:
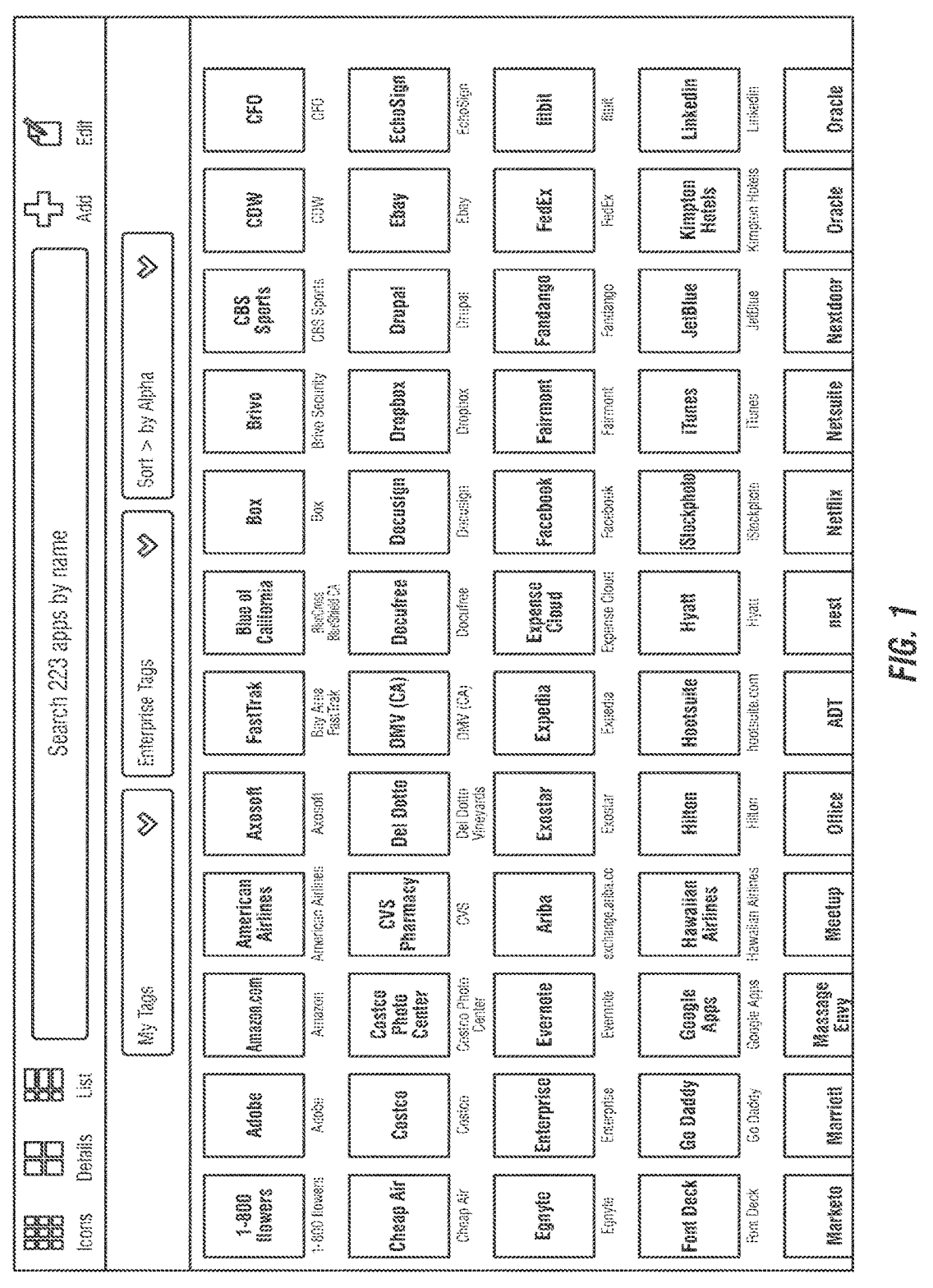

Non-exhaustive examples of web applications that can be aggregated by the server can be found in FIG. 1. FIG. 1 is a sample innovative interface of a user's page on a sSSO application, which displays a collection of web applications which the user had previously added to his sSSO application.

It should be appreciated that the aggregator platform is not limited to the social single sign-on environment. The techniques introduced herein are applicable to aggregators that allow end users to add an application, such that to link to the application at any future time, and from any device, would not need to reenter an ID and/or password. However, employing the social single sign-on implementation of the technique as discussion herein is for purposes of understanding the innovation herein and not for limiting purposes.

To access any of the user's web applications, the user registers and signs on to a social sign-on system ("sSSO") using any supported login identity provider user name and password. For example, the user can register to sSSO using his user name and password that he uses for his Linkedin account. If the user is registering for the first time, the sSSO collects additional information to verify the user later such as for a subsequent access to sSSO. For example, sSSO can collect but is not limited to collecting the user's mobile phone number, questions and answers related to information unique to the user, pictures, biometric data, and/or social information from the identity providers, such as for example information regarding friends, pictures, dates, and conversations. sSSO also automatically creates an sSSO secret user name and a sSSO secret, highly securely generated password. Both such secret user name and secret password are unknown and inaccessible to the user. In an embodiment, this secret user name and secret password are stored in an lightweight directory access protocol (LDAP) server or database or in a distributed cloud database system, etc. sSSO also maps or links the login identity provider user name to the secret user name and password of sSSO system for subsequent usage.

After the user has registered, the user can start using signal sign-on to login automatically to web applications available to the sSSO system. The login identity provider is mapped to the sSSO secret internal user name for purposes of displaying the configured SSO enabled web applications to the appropriate sSSO logged in user. In short, the sSSO secret internal user name is used to display the right apps (web applications) to the right user. Thus, for example, when the user obtains a new, upgraded smartphone, the user does not need to download and reenter the user ID and password for each of his web applications. The user can access any and all of his applications registered in the sSSO from the sSSO application.

FIG. 2 is a sample user interface showing icons representing an enabled and a not enabled SSO application. In this example, the leftmost icon, e.g. Office, represents an SSO enabled application while the icon to the right represents a web application, e.g. Office Depot, that is not enabled. In this example, the sSSO application is configured to display a visual indicator, such as the triangle with the exclamation sign inside, to indicate that such web application is not sSSO enabled.

Figure 3:
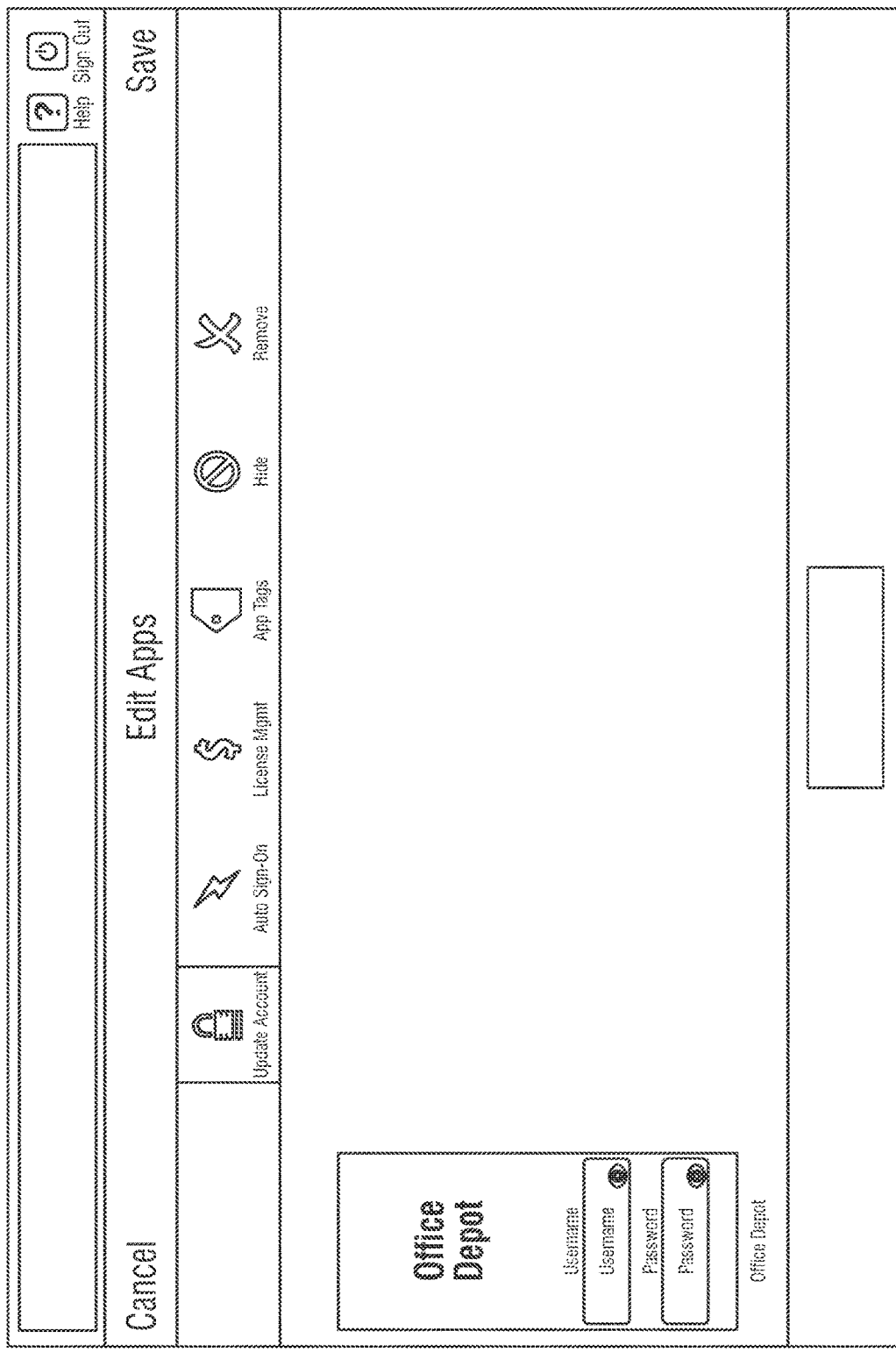
FIG. 3 illustrates an example of a user interface showing a log in graphical user interface (GUI) for a user to add and configure an organization to his aggregator platform, according to an embodiment.

In an embodiment, to enable a web application for sSSO requires entering a user name and optionally a password. An example implementation can be found in FIG. 3. FIG. 3 is a sample user interface of a registration screen to register a particular web application. In the registration screen, a user can enter his or her user name and optionally his or her password for the particular web application.

If the SSO web application, e.g. Office Depot in FIG. 3, is also a login identity provider then sSSO automatically maps or otherwise links the new login identity provider to the sSSO internal secret user name, which enables that login identity provider, e.g. Office Depot, to be used for login in purposes in addition to the existing registered login identity provider, e.g. the original sSSO system. As another example, Facebook and LinkedIn could both be login identity providers to the sSSO system assuming the LinkedIn web application was enabled for single sign-on.

If the sSSO user decides to login using a new unregistered login identity provider, e.g. Facebook, and the user never enabled that login identity provider web application for SSO, the sSSO system will attempt to identify the end user. For example, the sSSO system can go to and use a stored list of usernames and related metadata such as email addresses, actual names, etc., and display candidate selections, e.g. a list of users with similar names from the registered login identity providers, e.g. FACEBOOK: Julie@yahoo.com. That is, the sSSO system prompts the user to pick the login identity provider user name that they recognize. The login identity provider user name can be received by other input means such as for example the user entering his or her user name in a text box, audibly providing the user name, selecting an image that is recognized by the user, providing biometric data such as a finger print, and so on. In addition to using the received user input, the sSSO verifies the identity of the sSSO user by using additional registration information, that is information which was provided by the user when the user registered. For example, such additional registration information can include but is not limited to SMS, Questions/Answers, already registered login identity provider information, biometric information, etc.

Figure 4:
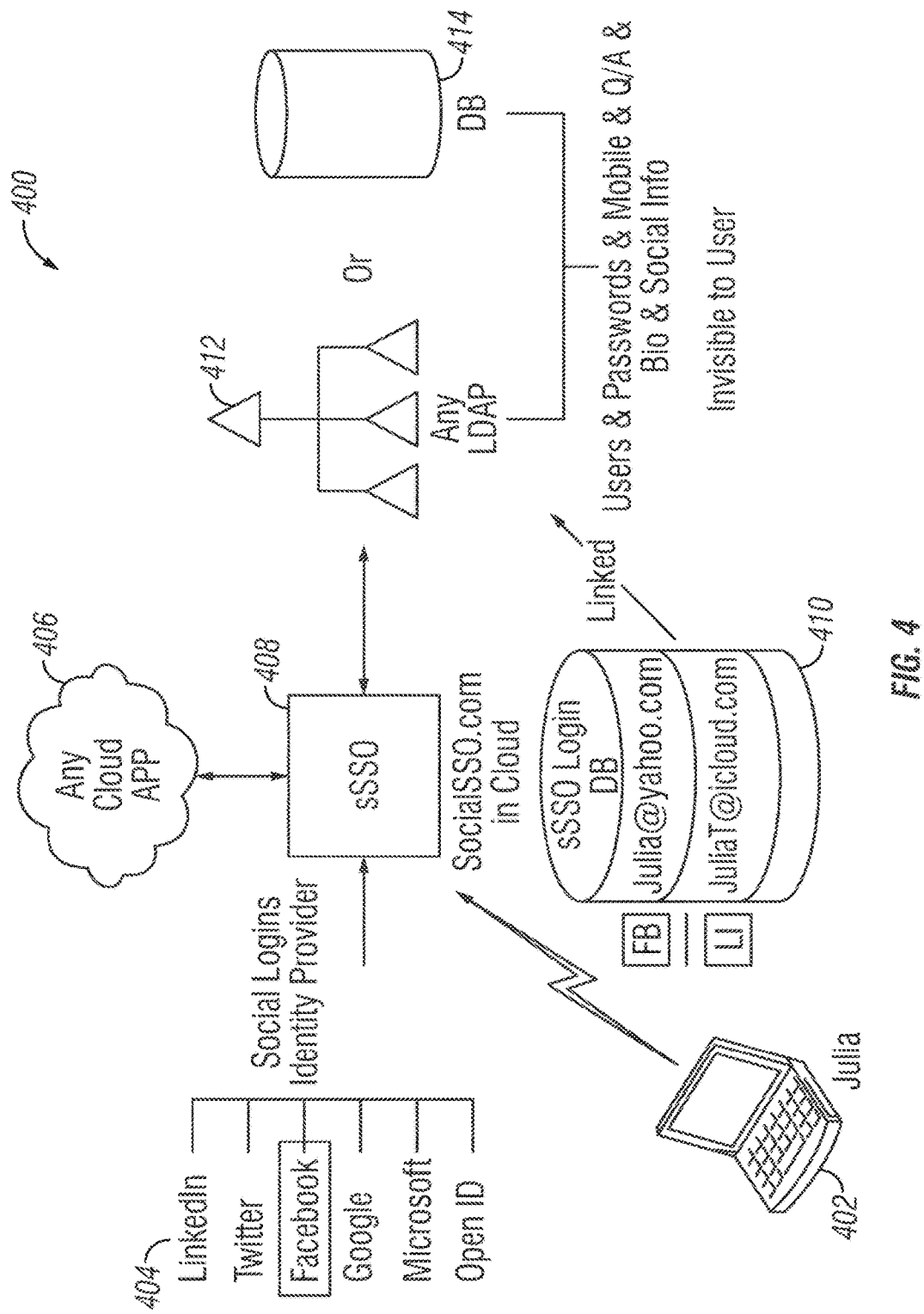
FIG. 4 is a schematic diagram of a system architecture for the aggregator platform, according to an embodiment.

An Exemplary Embodiment of Social Single Sign-on without Username or Password from a Single Sign-on Provider An embodiment can be understood with reference to FIG. 4. FIG. 4 is a schematic diagram of a system architecture for an aggregator platform, such as for example sSSO, without username or password from the provider, such as for example a SSO provider, 400. A user 402 logs into a social single sign-on (sSSO) application 408, e.g. such as at a website, SocialSSO.com for example, in a network environment such as in a cloud environment. A plurality of social login identity providers 404 are communicably connected with sSSO 408 such that for example a user can log onto sSSO 408 through any of these connected social logins identity providers 404. sSSO 408 is communicably connected to a repository, sSSO login database (DB) 410. In this illustrative example, repository 410 is storing two usernames associated with user 402: Julia@yahoo.com associated with her Facebook account and JuliaT@icloud.com associated with her Linkedin account. sSSO 408 is communicably connected to web applications in the cloud 406. When the user registered with sSSO 408, sSSO 408 requested additional data from the user that could be used in identifying the user at subsequent points in time. Types of such data include but are not limited to user data, passwords, mobile data, questions and answers, biometric data, and social data. sSSO 408 stores such data in a second repository 414 via a distributed directory information service over an Internet Protocol (IP) network 412 such as for example a Lightweight Directory Access Protocol (LDAP) system 412. These user names and other data stored in repository 414 and accessible via service 412 are invisible and inaccessible to the users. Thus, user 402 can login to sSSO 408 using any of her existing social usernames (as shown in repository 410) associated with the respective social login identity provider, which is linked to the user's secret data stored in repository 414. Then, after making the link, sSSO proceeds to verify the user by using any of such data in repository 414, such as for example, asking for a cell phone number or a asking a question and expecting a specific answer that matches a stored answer.

Social Federation Social Single Sign-on

Social Federation social single sign-on ("sFed") can be a system, API, or service that enables an organization such as a company, a university, or a government agency, etc. or end user to easily and securely enable an external party such as a contractor, vendor, alumni, family, friends, etc. access to internal (private) and external (public) web applications without using traditional federation technologies or manyually requiring setting up a new user name and password. sFed combined with sSSO easily and securely shares web site login-related data with any user who already has a username and password on a login identity provider website.

Figure 5A:
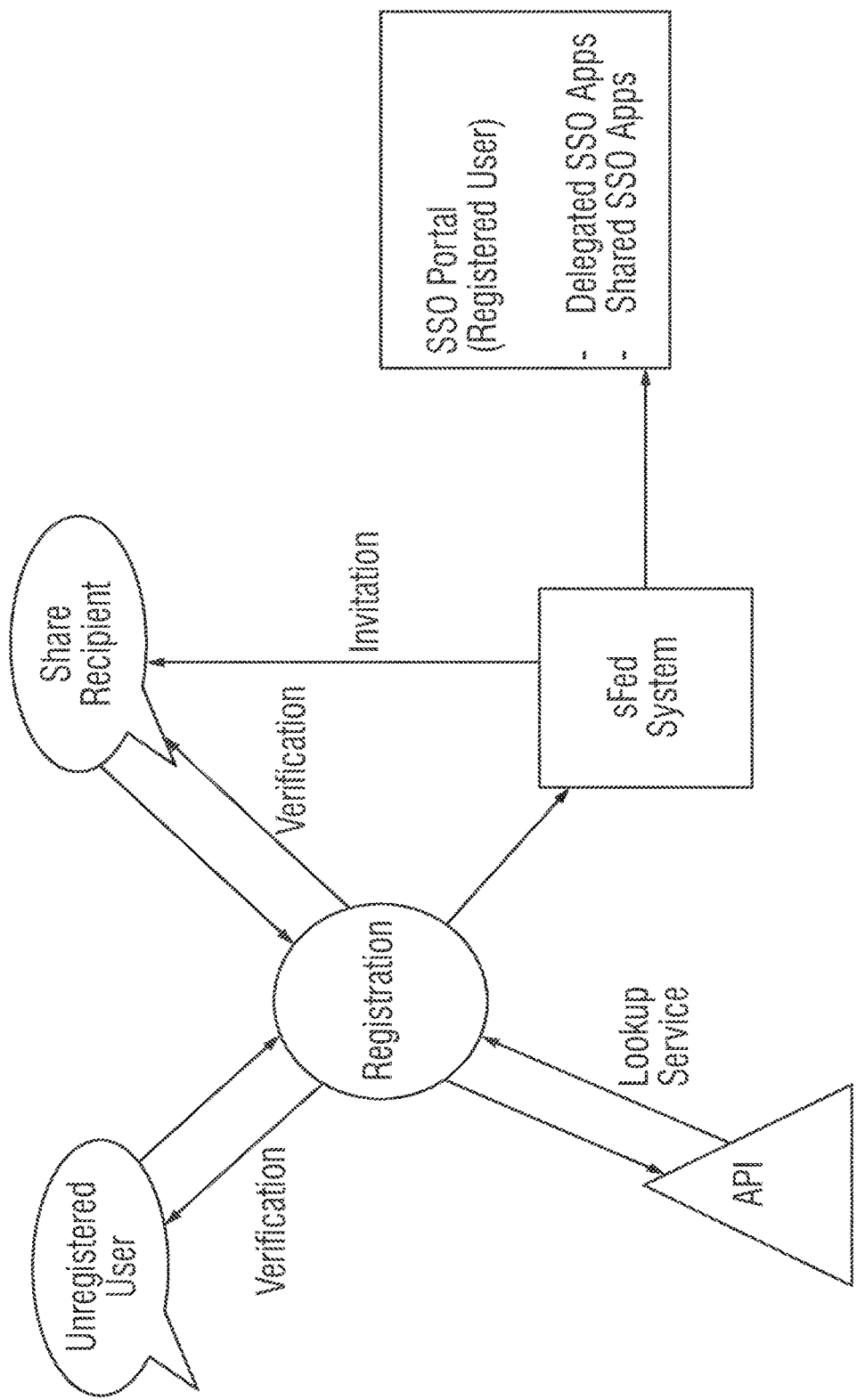
FIG. 5A is a flow diagram of a process for registration to a social federation system, according to an embodiment.

An embodiment of the invention can be understood with reference to FIG. 5A. FIG. 5A is a flow diagram of a process for registration to a social federation system. To use the sFed system requires an external party to register in sSSO or any registered sSSO user to invite an unregistered sSSO user. After they have been registered, the sFed system detects sSSO registration and registered login identity provider user name. Using the sFed system, API, or service, the organization sFed administrator or a sSSO user can delegate (share) sSSO enabled web applications to a registered user or invite an unregistered sSSO user which automatically registers the user into the sSSO system by requiring the invited user to login once to the sSSO system using a login identity provider user name. For example, FACEBOOK: Julie@yahoo.com registers on sSSO and sFed verifies her identity by sending her a SMS token, or question associated with an expected (Q/A), or requiring a biometric confirmation. Thus, in an embodiment, requiring a user to remember and enter login informational data is not needed. sSSO is configured to transmit an alert to the user, where the user can respond with identifying-related data as discussed above.

Figure 5B:
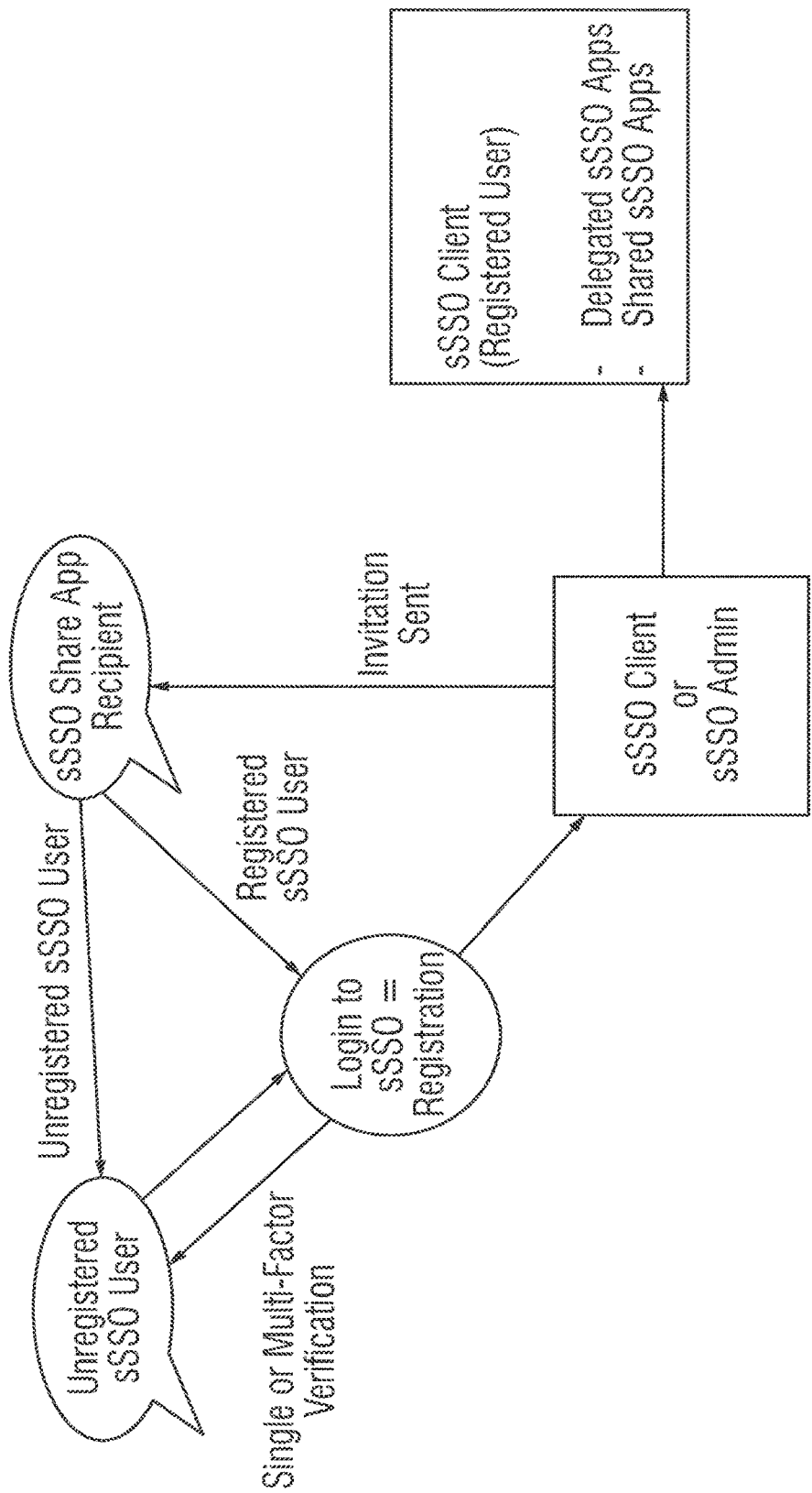
FIG. 5B is a flow diagram of a process for registration to an aggregator system, according to an embodiment.

An embodiment of the invention can be understood with reference to FIG. 5B. FIG. 5B is a process flow for registration to the sSSO system. A user such as an sSSO Client or sSSO Administrator sends an invitation to a recipient, e.g. sSSO Share App Recipient, for the purposes of sharing or delegating an application. If the sSSO recipient is already registered with sSSO, e.g. is a Registered sSSO User, then when such sSSO recipient logs in to sSSO and accepts the invitation, the delegated application is added by the sSSO system to the recipient's collection of sSSO applications. If the sSSO recipient is not yet registered with sSSO, then with the invitation, such recipient is provided the opportunity to register with the sSSO system by providing single or multi-factor verification data. Subsequently, the recipient is a registered sSSO user and the application is added to such user's collection of sSSO applications.

In an embodiment, sSSO enables a user to share login capability along with sharing an application.

Figure 6:
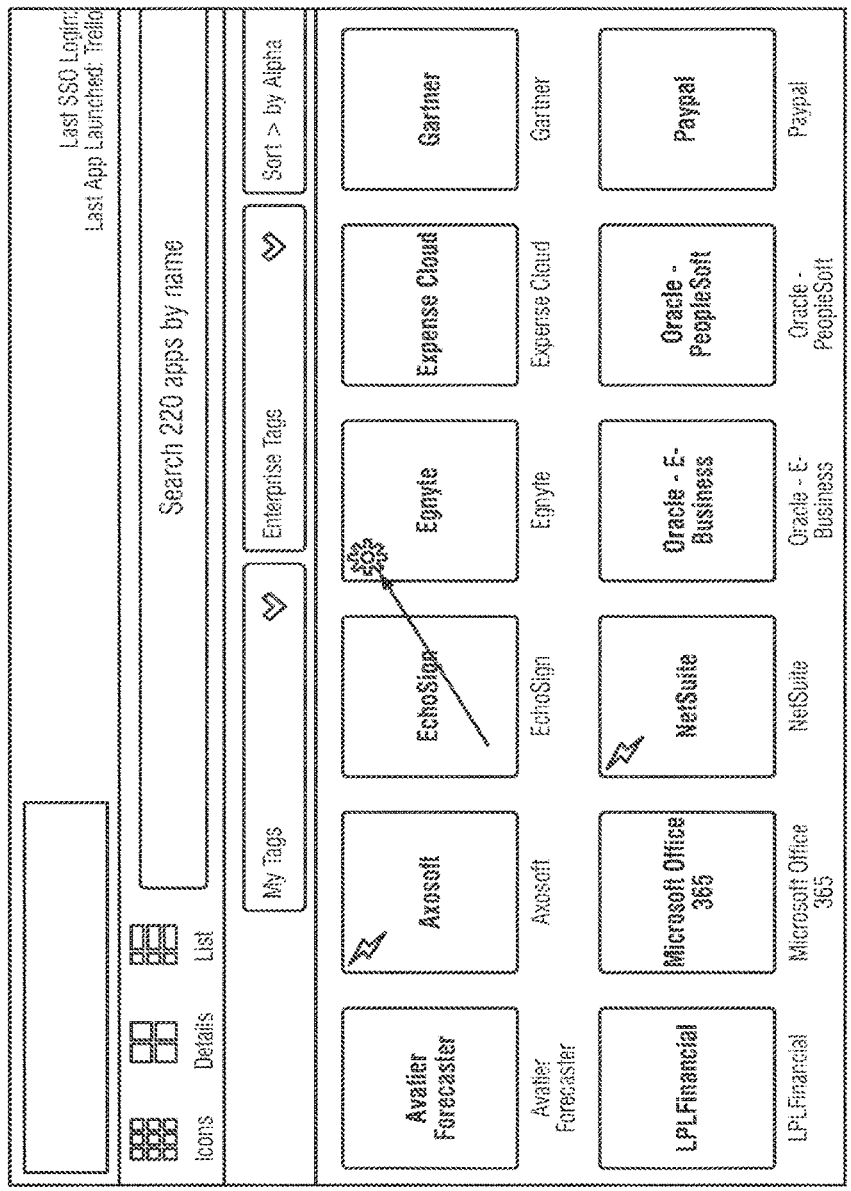
FIG. 6 illustrates an example of a user interface showing an SSO user sharing an application with an unregistered or registered SSO user, according to an embodiment.

FIG. 6 is a sample user interface showing an SSO user sharing an application with an unregistered or registered SSO user. The user initiates the process for the selected SSO application, e.g. Egnyte, by clicking on the icon.

Figure 7:
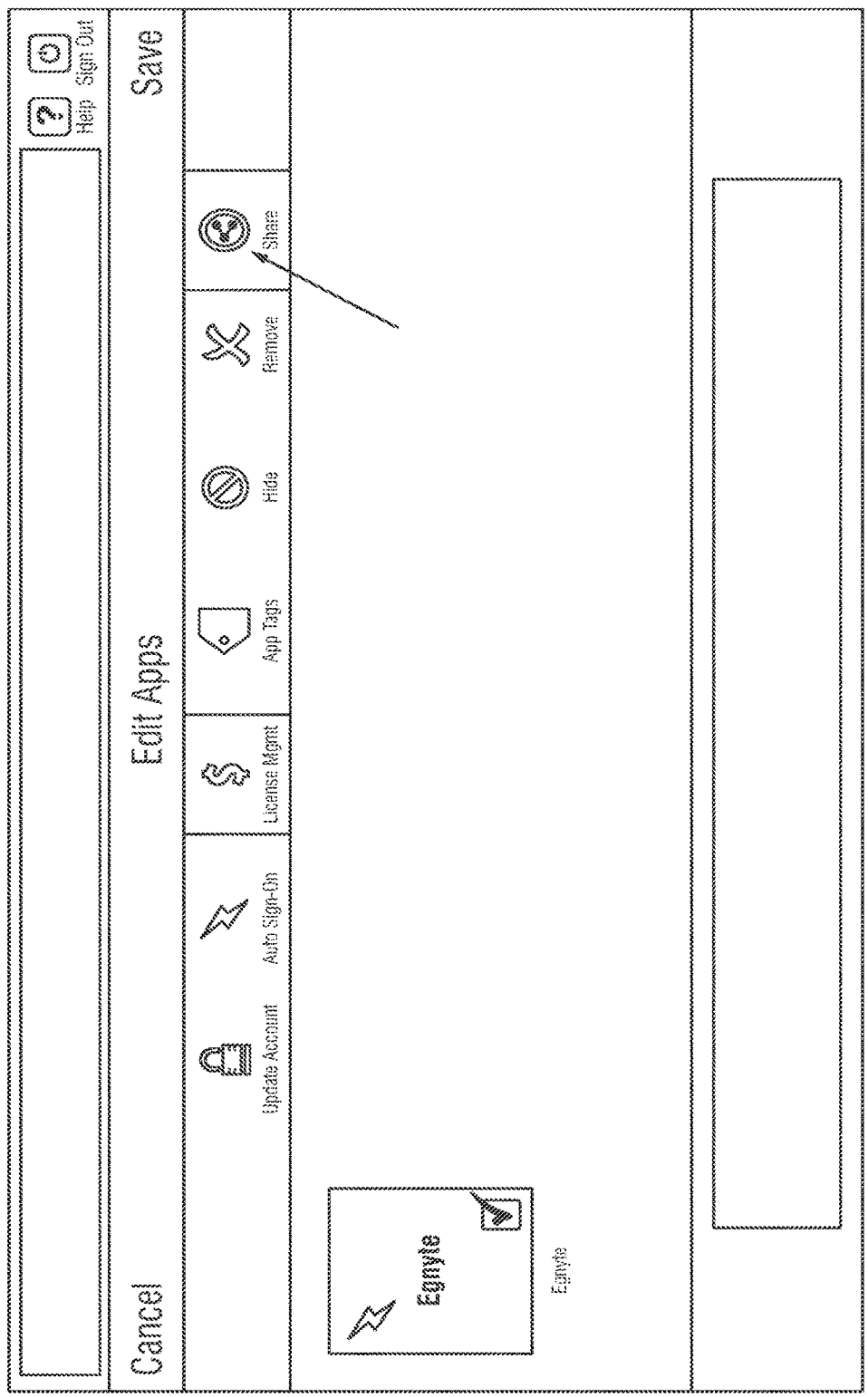
FIG. 7 illustrates an example of a user interface showing a user has selected a Share command to send to a recipient user.

FIG. 7 is a sample user interface showing a user has selected a share command to send to a recipient user. The share command can be sent via multiple methods including but not limited to email, SMS, social network, copying, etc.

Figure 8:
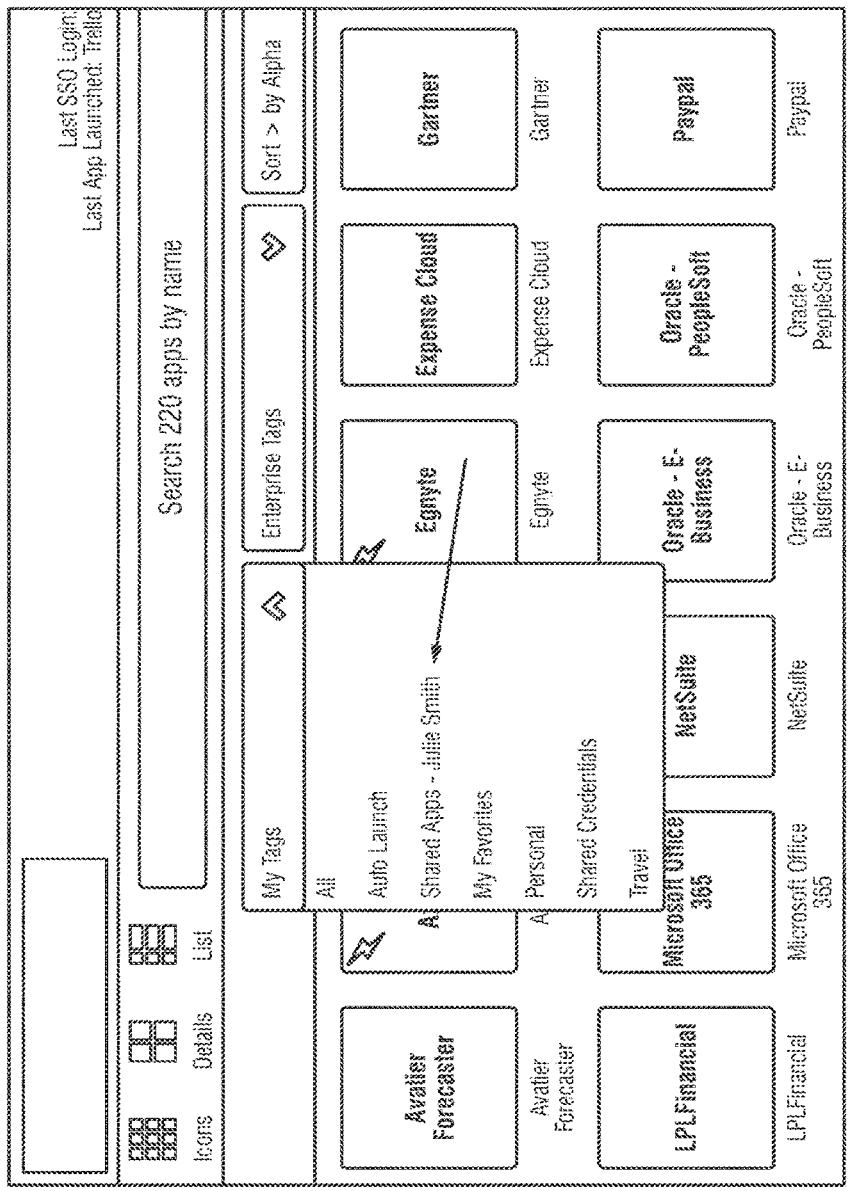
FIG. 8 illustrates an example of a user interface showing how after the SSO user proceeds with registration or log in to SSO, the system provides the user the capability of seeing his shared SSO applications, according to an embodiment.

FIG. 8 is a sample user interface showing how after the SSO user proceeds with registration or login to SSO, they subsequently have capability of seeing or accessing shared SSO applications. For example, the user can access the shared applications by selecting a drop menu that contains a link to a shared apps page. In this example, the system provides a link to shared applications for each recipient.

Figure 9:
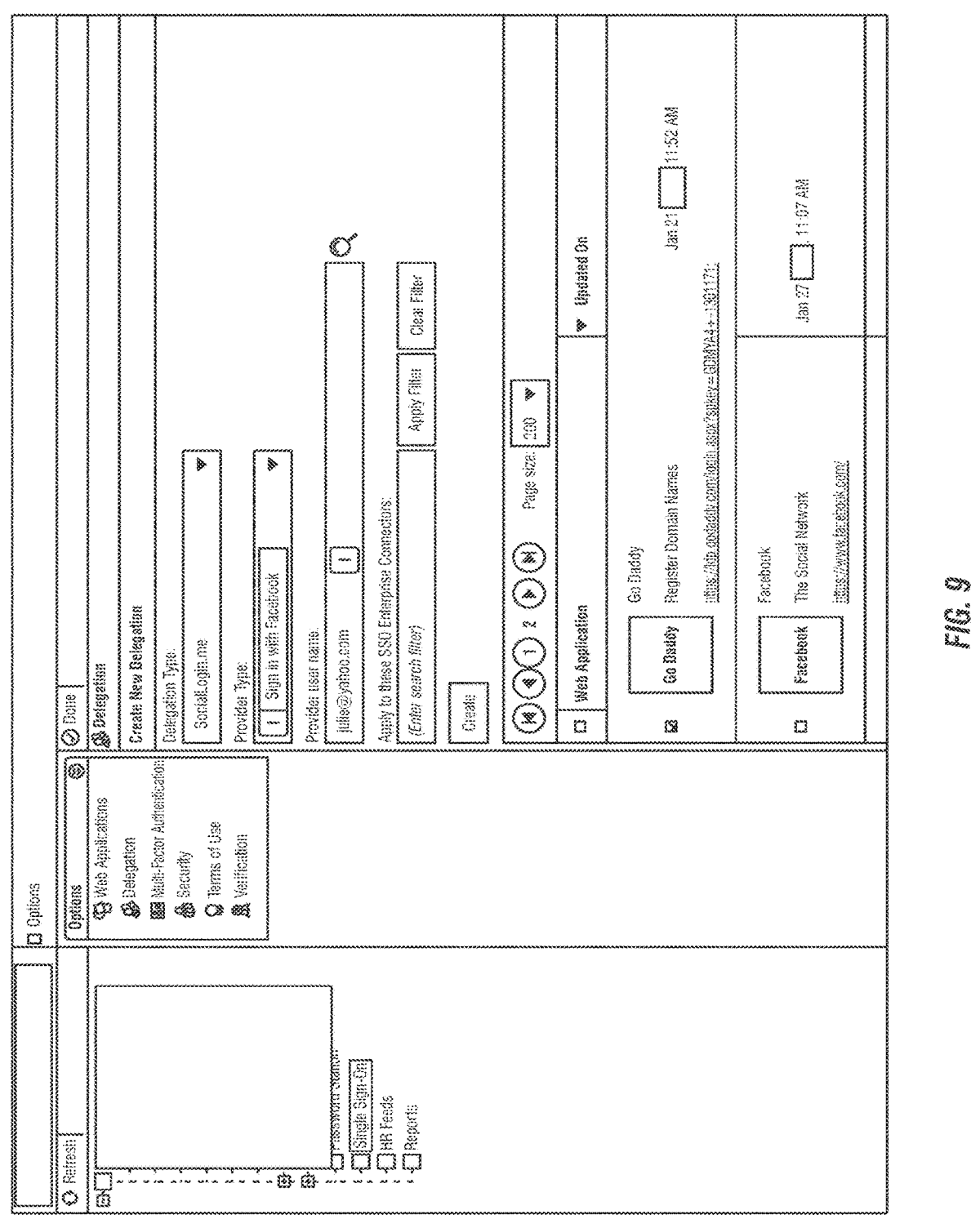

An embodiment provides a sSSO delegation administrator model and corresponding functionality. An administrator can delegate a particular sSSO user to a particular sSSO application, as shown in FIG. 9 for example. FIG. 9 is a sample user interface of a delegation page in which a user can enter a delegation type, e.g. SocialLogin.me, provider type, e.g. Sign in with Facebook, a provider user name, e.g. Julie@yahoo.com, applicable filters, and a selection of one or more applications to share, e.g. Go Daddy.

Figure 10:
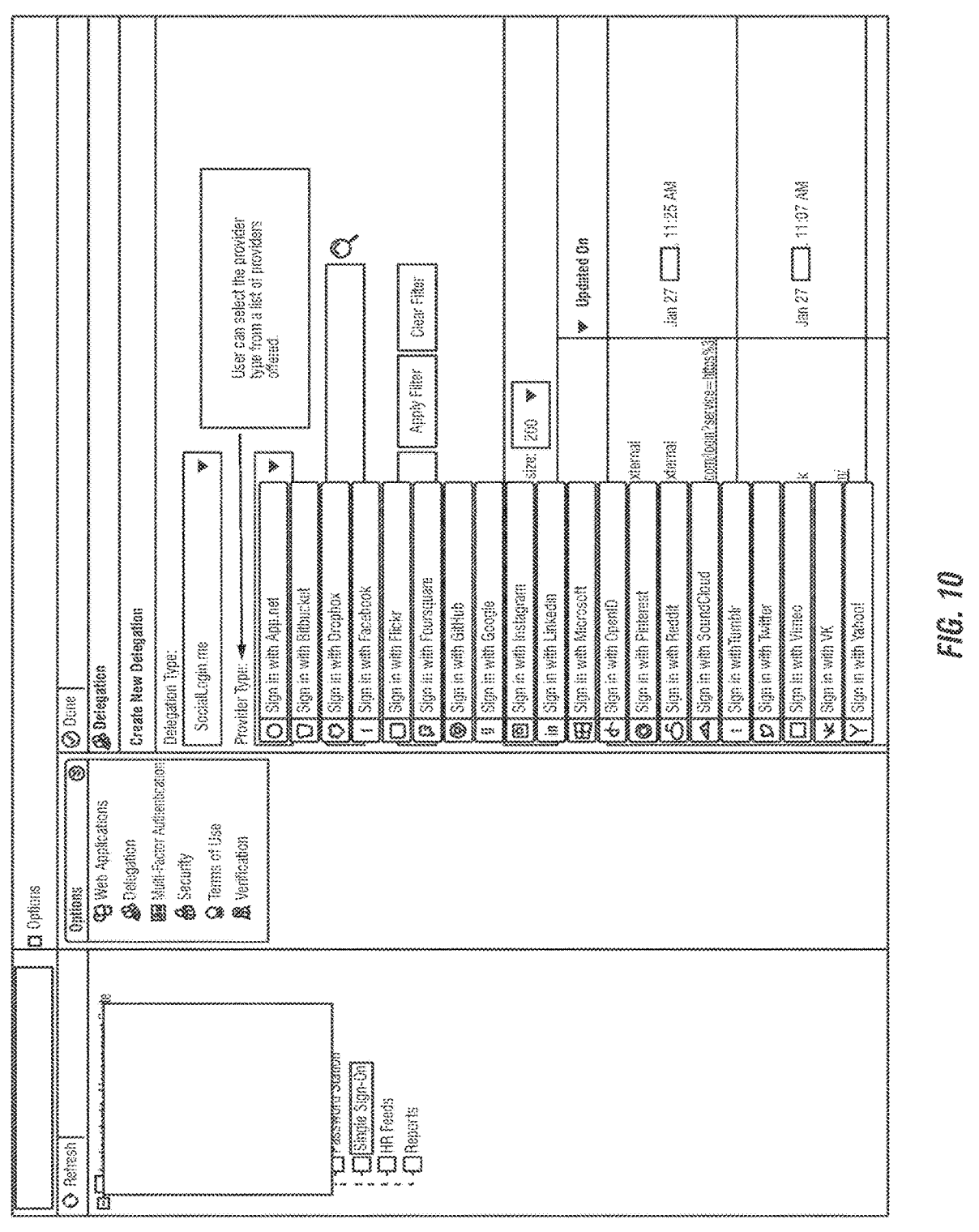

FIG. 10 is a sample user interface showing a non-exhaustive sample dropdown list of the provider types of FIG. 9, each selected type enabling the user to sign in to sSSO and/or sSSO's various enabled web applications or sSSO enterprise connected applications.

If the sFed administrator or sSSO end user is delegating (sharing) a SSO enabled web application, that is using a fixed username and password or a known user name and password to multiple people or shared within the organization to the sSSO user, then system is configured to cause the shared web application to automatically appear on the sSSO users' sSSO interface. For example, sFed uses an API or direct database calls to add the new SSO enabled web application to the user's sSSO interface.

If the sFed administrator is delegating a SSO enabled web application that is using a username and password that is unique to the sSSO user, then sFed automatically creates a user name and password on the enabled web application. For example sFed can use a format for exchanging authentication and authorization data between parties such as between an identity provider and a service provider, e.g. Security Assertion Markup Language (SAML). Or sFed can use internal methods. Then the SSO enabled web application automatically appears enabled on the sSSO user's sSSO interface.

Web Crawler for Applications Requiring Logons

A technique is introduced by which a web crawler system crawls for web applications that require logons, regardless of content. Each identified web application is added to a database, such as for example the sSSO databases 410 or 414, of such type of applications. In accordance to one technique, the web crawler system discovers a web application and then attempts to logon to the application with a bogus ID and a bogus password. If the attempt is unsuccessful, the web crawler system creates a definition for the web application, where the definition defines attributes of the web application. The web crawler system uses these attributes to categorize the web application within the database. Based on matching the categorization and user profiles, the web crawler system offers the web application to a particular user to add the web application to the user's aggregation of web applications. For instance, the web crawler system can display or send a message to the particular user indicating, "You like bicycles. Perhaps you'd like to add this bicycle application ('bikeapp.com') to your aggregated applications."

Alternate Embodiments

Figures 11, 12:
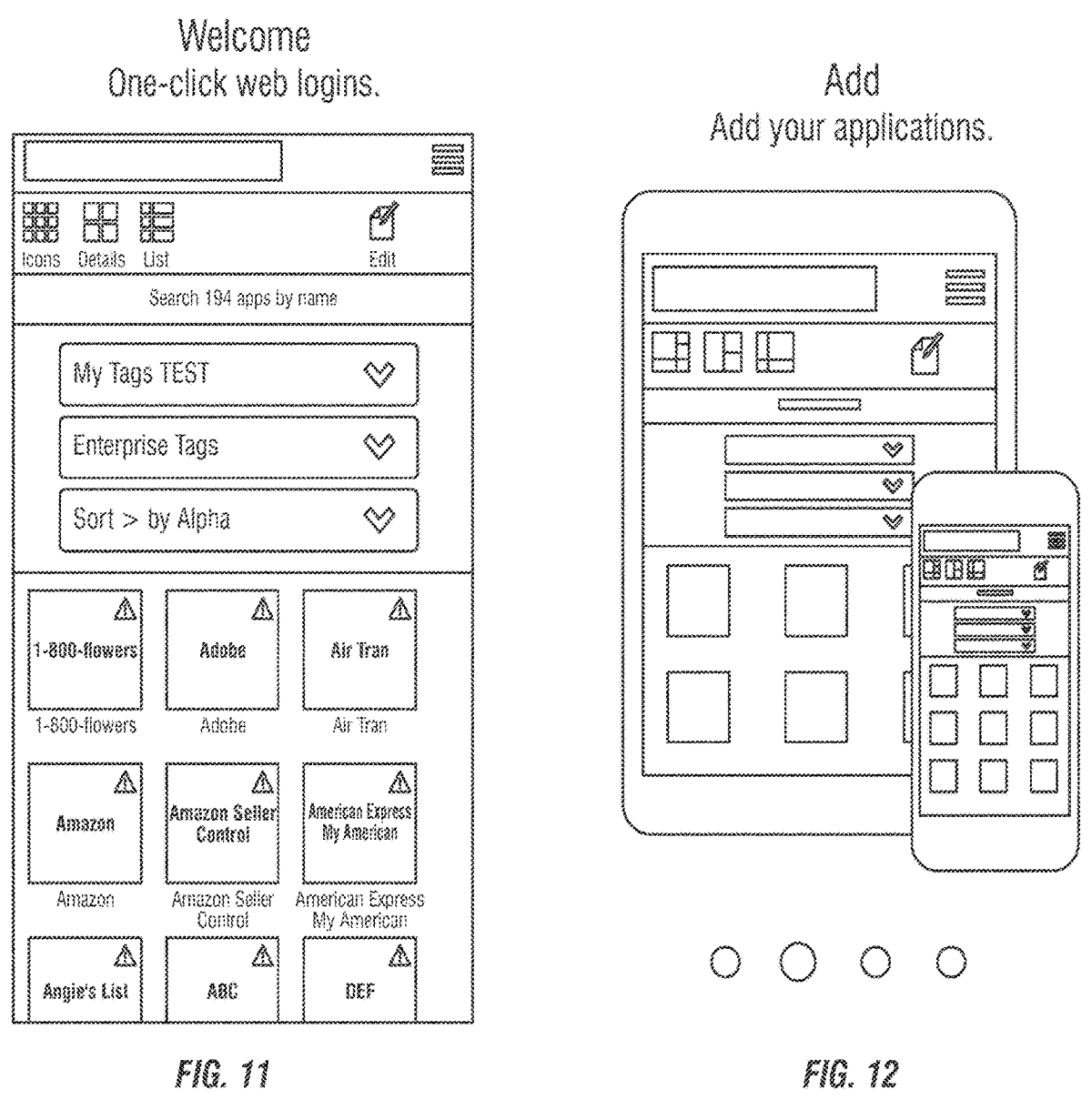
Figure 14:
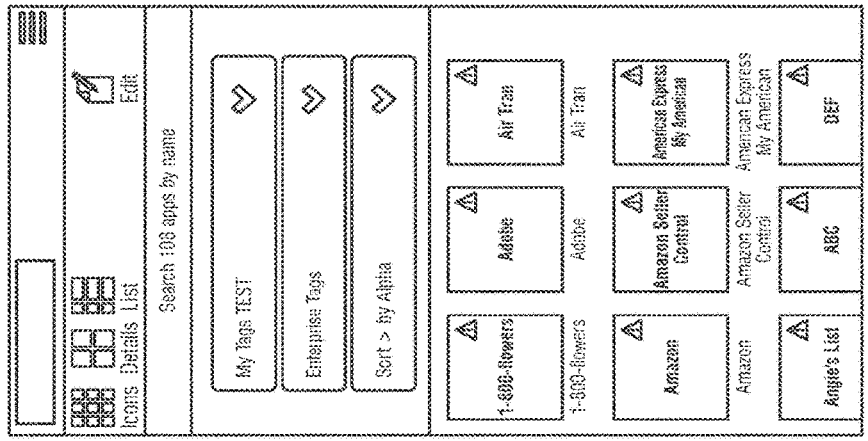
FIG. 14 illustrates an example of a user interface showing icons representing web applications which were added to the system and from which the user can launch with just one click, according to an embodiment.
Figure 13:
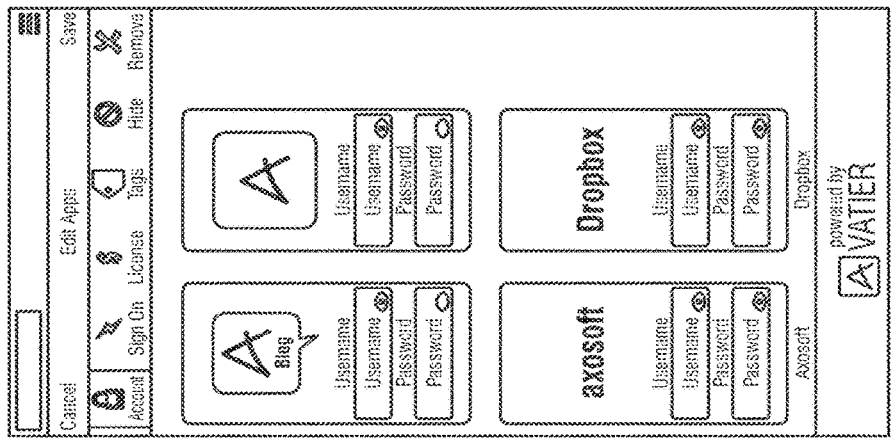
FIG. 13 illustrates an example of a user interface showing four web applications that a user can configure to add to his aggregator system, according to an embodiment.

A smartphone or tablet paradigm or environment illustrates how the innovation solves the technical problem of using computer network resources and bandwidth efficiently by streamlining user interactions with the network. FIG. 11 illustrates an example of a user interface showing a home page of the aggregator system. FIG. 12 illustrates an example of two different devices, a tablet and a smartphone, each displaying the home page web page of the aggregator system. FIG. 13 illustrates an example of a user interface showing four web applications that a user can configure to add to his aggregator system. FIG. 14 illustrates an example of a user interface showing icons representing web applications which were added to the system and from which the user can launch with just one click.

For any new device and in particular for the devices shown, the innovation streamlines user interactions with network, because the user does not need to download and reenter a user ID and password for each of the user's applications. With the technique introduced herein, the user can launch any application already registered in the aggregator platform with a single click, for instance as shown in FIG. 14.

A further efficiency, among others, is afforded the technique introduced here by enabling a user from any device the ability to login with one click to the aggregator system, e.g. as shown in FIG. 11.

A further efficiency is afforded the technique by allowing the user, in addition to launching with one click to a designated application, to add and configure a new application to his already registered applications, as shown in FIGS. 12 and 13.

An Example Machine Overview

Figure 15:
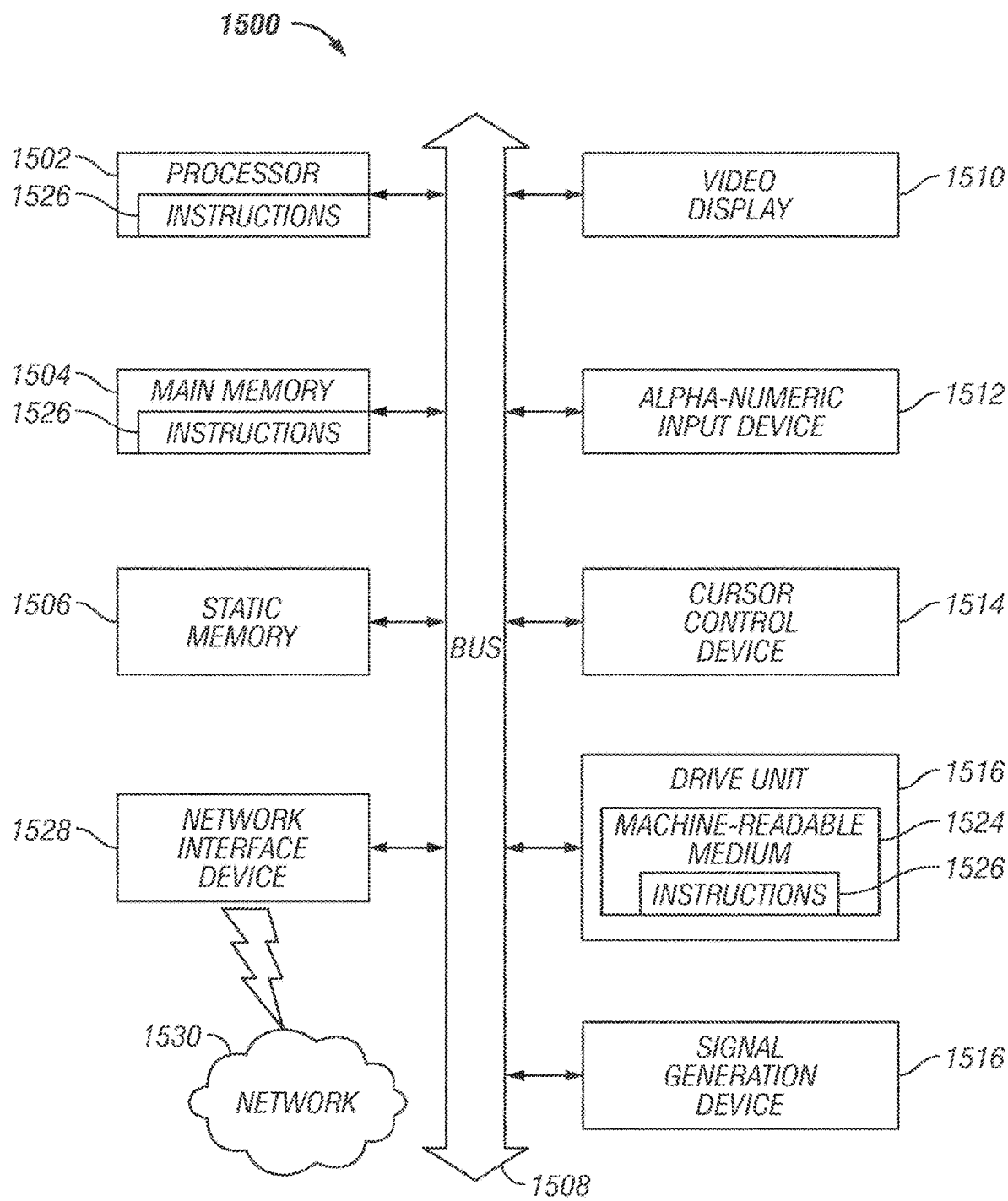
FIG. 15 is a block schematic diagram of a system in the exemplary form of a computer system according to an embodiment.

FIG. 15 is a block schematic diagram of a machine in the exemplary form of a computer system 1500 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1500 includes a processor 1502, a main memory 1504 and a static memory 1506, which communicate with each other via a bus 1508. The computer system 1500 may further include a display unit 1510, for example, a liquid crystal display (LCD) or a cathode ray tube (CRT). The computer system 1500 also includes an alphanumeric input device 1512, for example, a keyboard; a cursor control device 1514, for example, a mouse; a disk drive unit 1516, a signal generation device 1518, for example, a speaker, and a network interface device 1528.

The disk drive unit 1516 includes a machine-readable medium 1524 on which is stored a set of executable instructions, i.e. software, 1526 embodying any one, or all, of the methodologies described herein below. The software 1526 is also shown to reside, completely or at least partially, within the main memory 1504 and/or within the processor 1502. The software 1526 may further be transmitted or received over a network 1530 by means of a network interface device 1528.

In contrast to the system 1500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing computations with cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions that enable users, e.g. users on the go, to login to sSSO web applications using social network identity providers or share sSSO web applications anywhere on such internet-enabled devices, servers, or clients. It further should be appreciated that one or more cloud computing embodiments include allowing a user to login to sSSO web applications using social network identity providers or share sSSO web applications using mobile devices, tablets, and the like, as such devices are becoming standard consumer devices.

An Exemplary Service Store Implementation

An embodiment is provided in which an online service store or storefront is created and presented to consumers or users on behalf of consumers. Via the online service store, the user can see what the services cost up front and the service store provides users a way to buy those services. In addition, the service store enables a user not just to buy the services but be able to schedule the services online. The service store figures out and presents when a user's next appointment is or when the next available appointment is. The service store also is configured to enable the user and other parties to sign a service contract, e.g. the service level agreement, online. Also, the service store enables the user and the service provider to fine tune or adjust the price online. For example, the service store can compute a price based on criteria associated with the user such as for example, the number of employees a user has or the number of sites the user has. In an embodiment, the service store is communicably coupled to a social single-sign on aggregate identity system, which enables the service store to employ the latest information about the user in such a way as to create a unique service that is tailored to the user. For example, if the user has selected to apply for a home equity line of credit ("HELOC") via the service store, the service store can accept any credentials of the user, such as the user's accessing the service store via Facebook, send such credentials to the social single-sign on aggregate identity system, receive specific data about the user, e.g. the user's income and current credit card debt, and use the specific information to create a unique HELOC application (service) and present it to the user.

Figure 16:
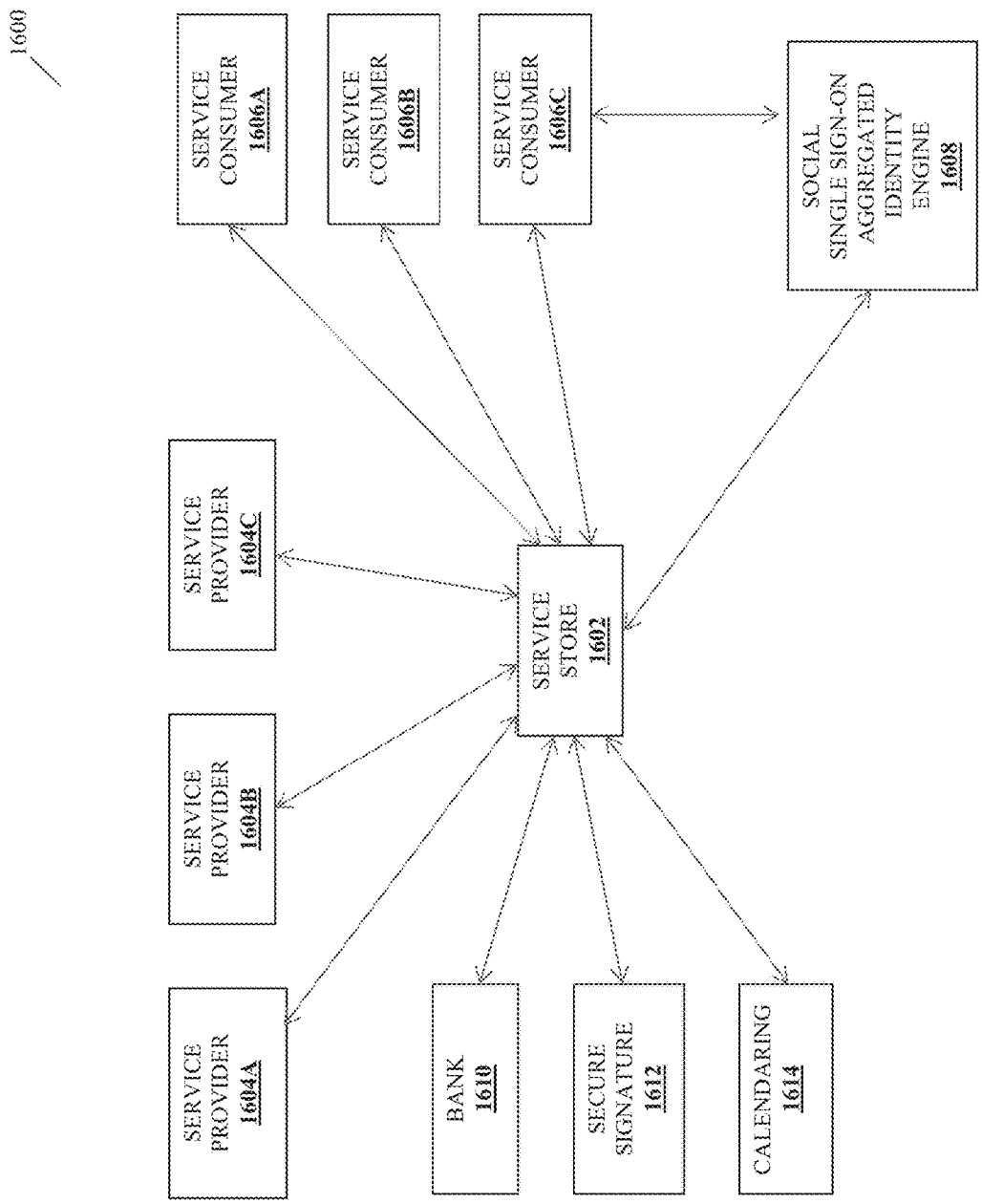
FIG. 16 is a block schematic diagram of a service store environment showing how the service store interacts with service consumers, service providers, the social single sign-on aggregated identity engine, and various external partners, according to an embodiment.

An embodiment can be understood with reference to FIG. 16, a block schematic diagram of a service store environment 1600 showing how the service store interacts with service consumers, service providers, the social single sign-on aggregated identity engine, and various external partners. A service consumer (any of 1606A-C) accesses the online service store 1602 to browse and select an appropriate service. For example, service consumer 1606A desires to apply for a HELOC. Service consumer 1606A can be a person desiring the service, a person requesting the service on behalf of a different end consumer, or a programmed entity or agent that is programmed to select a service and begin the process. In another embodiment, service consumer 1606A can access service store 1602 not directly but through the aggregator platform as shown in FIG. 1. That is, the service store can be a web application which the user had previously added to his sSSO application, as described above.

Service store 1602 is communicably coupled to service providers (any of 1604A-C) via one or more networks and via appropriate application programming interfaces ("APIs"). For example, service provider 1604A also interfaces with service store 1602 to upload images (e.g., photographs, drawings, composite of GUI elements, etc.), criteria, and other relevant data pertaining to the service to be provided, as discussed in further detail below. Service store 1602 is also communicably coupled over one or more networks using APIs to partner entities such as but not limited to banks 1610, entities providing secure signatures of documents 1612, e.g. @DocuSign Inc., San Francisco, Calif., and calendaring entities, e.g. Outlook, Microsoft, Redmond, Wash.

Service store 1602 is communicably coupled to a social single sign-on aggregated identity engine 1608 ("identity engine"), e.g. via an API. Examples of such identity engines include but are not limited to the aggregator platform as shown in FIG. 4.

Figure 17:
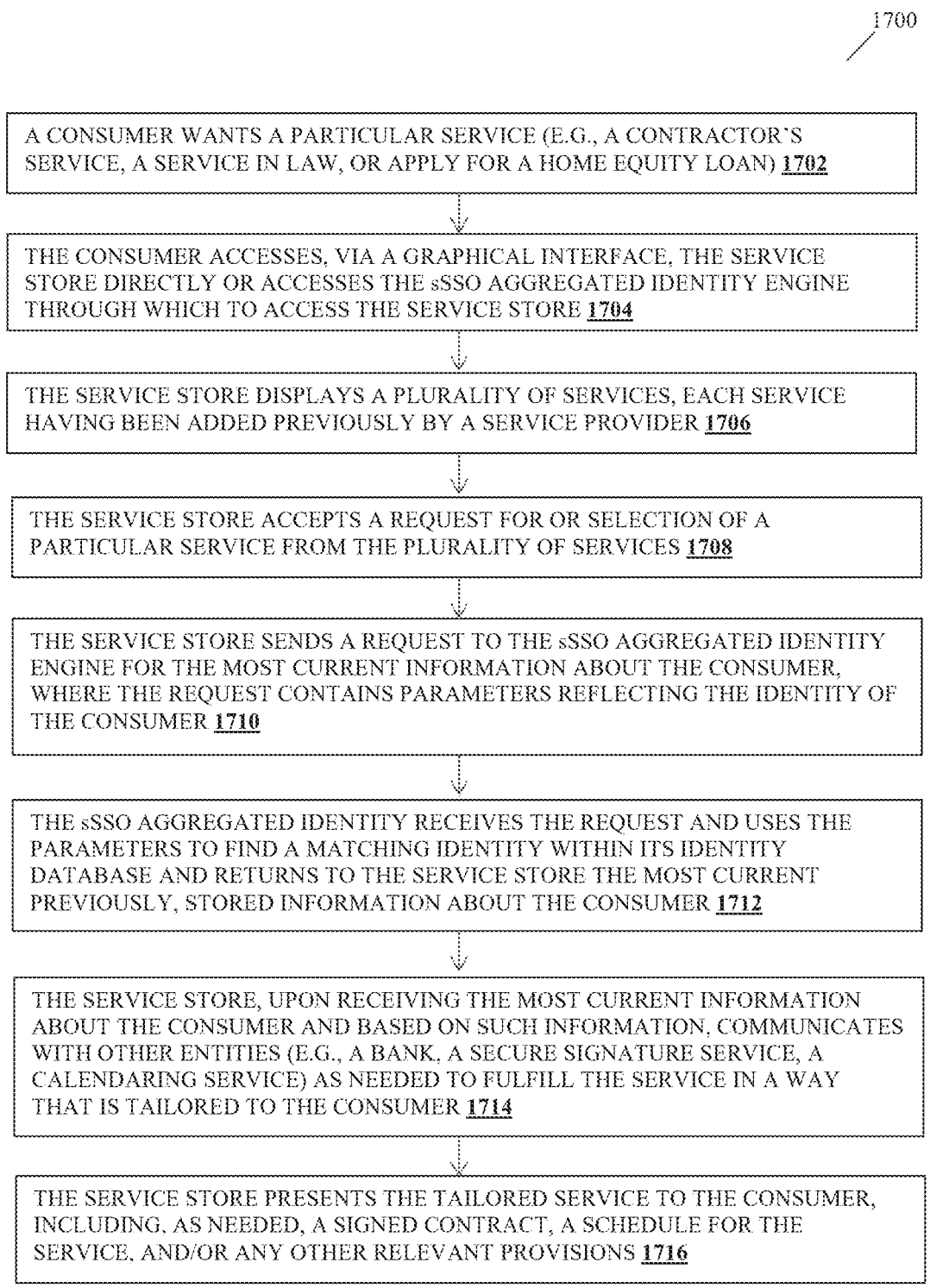
FIG. 17 is a flow diagram of an ordering and fulfillment process using the service store environment, according to an embodiment.

Another embodiment of the invention can be understood with reference to FIG. 17, a flow diagram of an ordering and fulfillment process using the service store environment 1700. At step 1702, a consumer wants a particular service (e.g., a contractor's service, a service in law, or apply for a HELOC). At step 1704, the consumer accesses, via a graphical interface, the service store directly or accesses the sSSO aggregated identity engine through which to access the service store. At step 1706, the service store displays a plurality of services, each service having been added previously by a service provider. At step 1708, the service store accepts a request for or selection of a particular service from the plurality of services. At step 1710, the service store sends a request to the sSSO aggregated identity engine for the most current information about the consumer, where the request contains parameters reflecting the identity of the consumer. At step 1712, the sSSO aggregated identity receives the request and uses the parameters to find a matching identity within its identity database and returns to the service store the most current previously, stored information about the consumer. At step 1714, the service store, upon receiving the most current information about the consumer and based on such information, communicates with other entities (e.g., a bank, a secure signature service, a calendaring service) as needed to fulfill the service in a way that is tailored to the consumer. At step 1716, the service store presents the tailored service to the consumer, including, as needed, a signed contract, a schedule for the service, and/or any other relevant provisions.

Another embodiment can be understood with reference to FIGS. 18A-K, which are exemplary screen shots showing graphical iconic representations of various services offered by the service store and their introductory pages.

In an embodiment, the service store interface is iconic, e.g. it uses icons to represent the services that are configured and offered. When a user clicks on any of the services, the process takes the user to a landing page. For example, the service provider may want to be able to monetize on that landing page. The service store is a generic store that contains any services. Thus, by way of the techniques discussed herein, instead of creating a website, which can be laborious, complex, and difficult, a service provider can create a store. The service provider can configure and offer whatever services they want. For instance, the service provider can configure the service to offer basic services for free or for a relatively low price. In addition, the service provider can include premium types of models, premium services such as a scheduler or other capabilities that may incur a cost. Contract integration is an example of a feature that can be optionally requested by a service consumer for a fee.

Figure 18A:
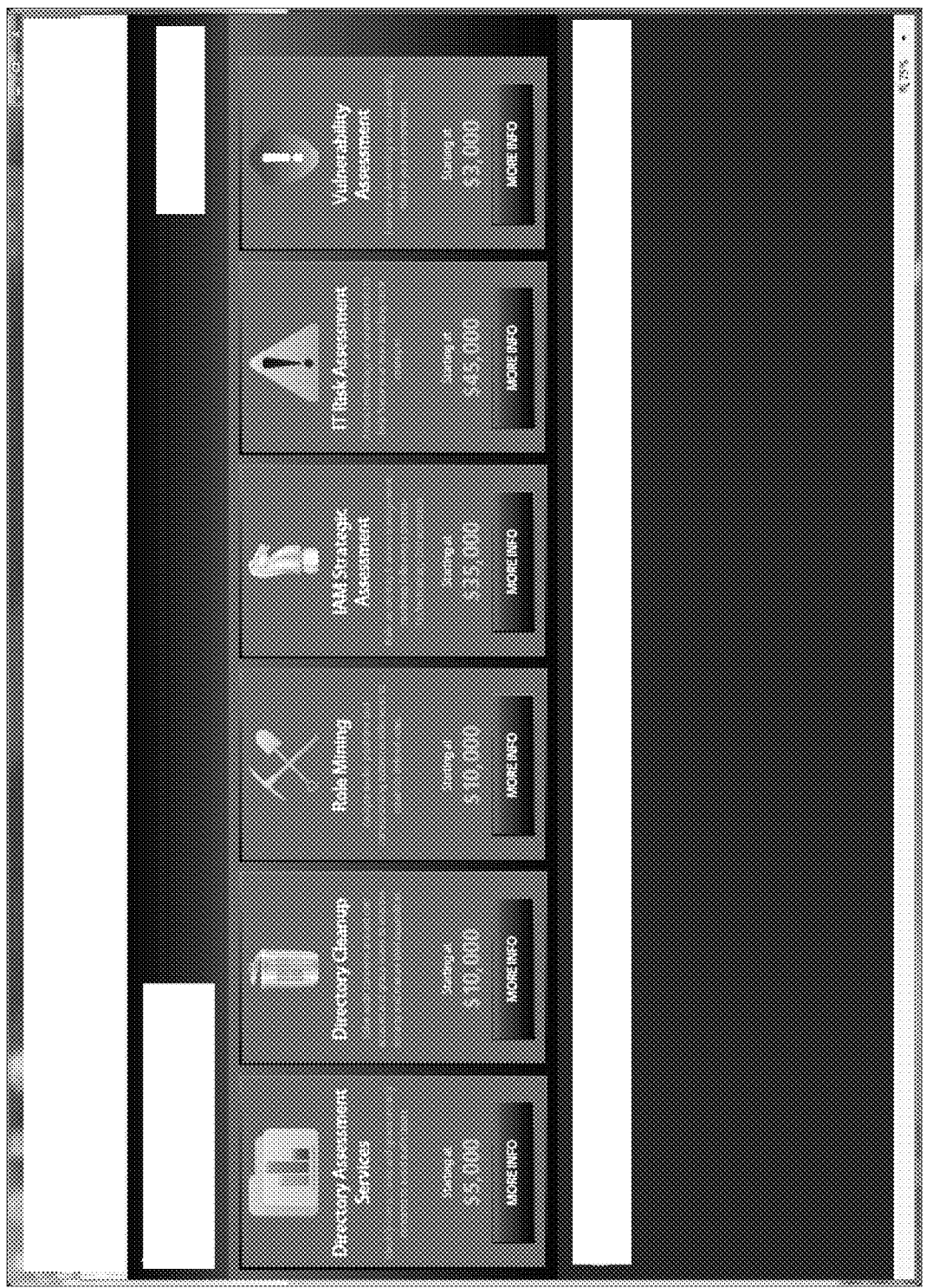
FIGS. 18A-K are exemplary screen shots showing graphical iconic representations of various services offered by the service store and their introductory pages, according to an embodiment.
Figure 18B:
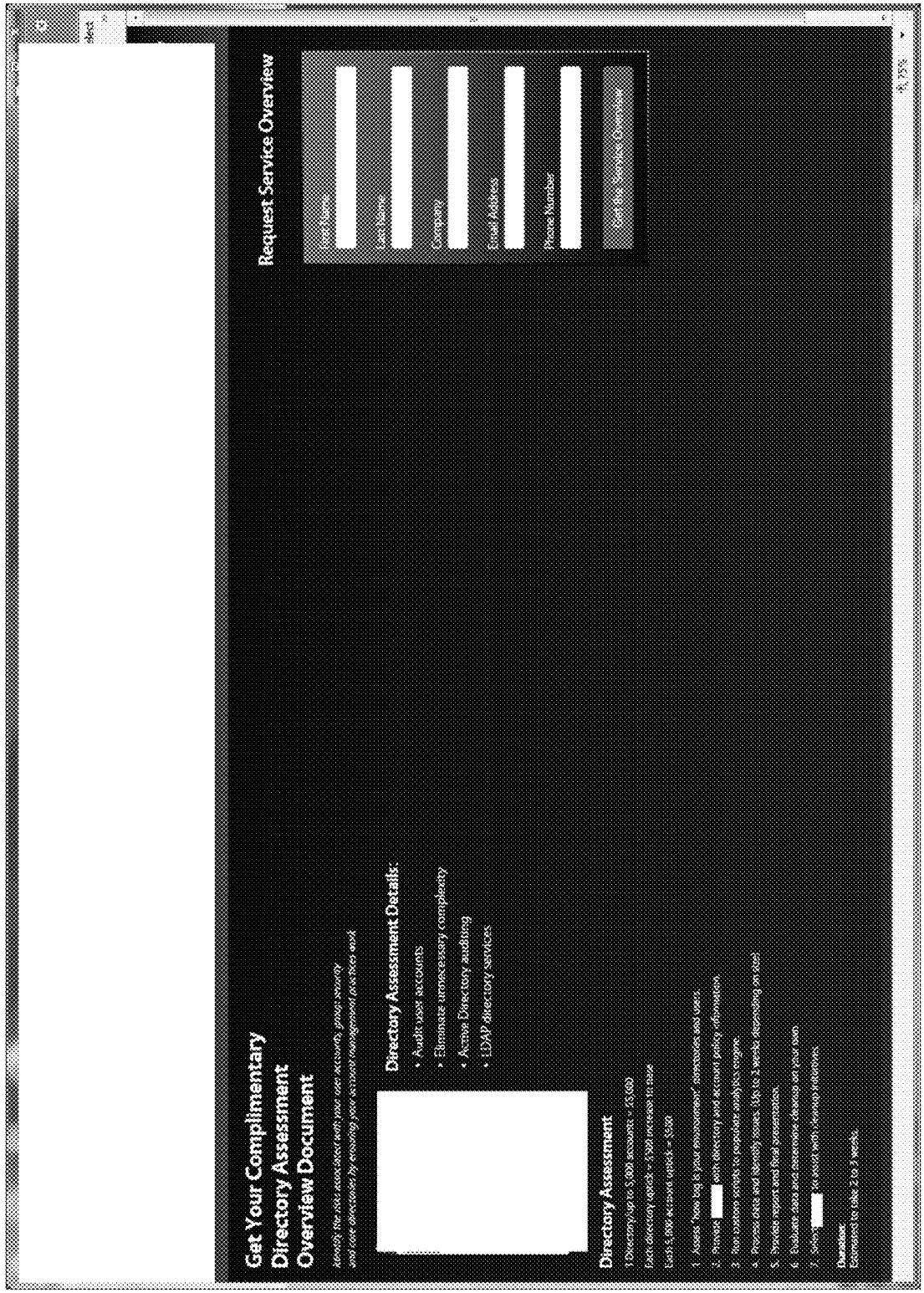
Figure 18C:
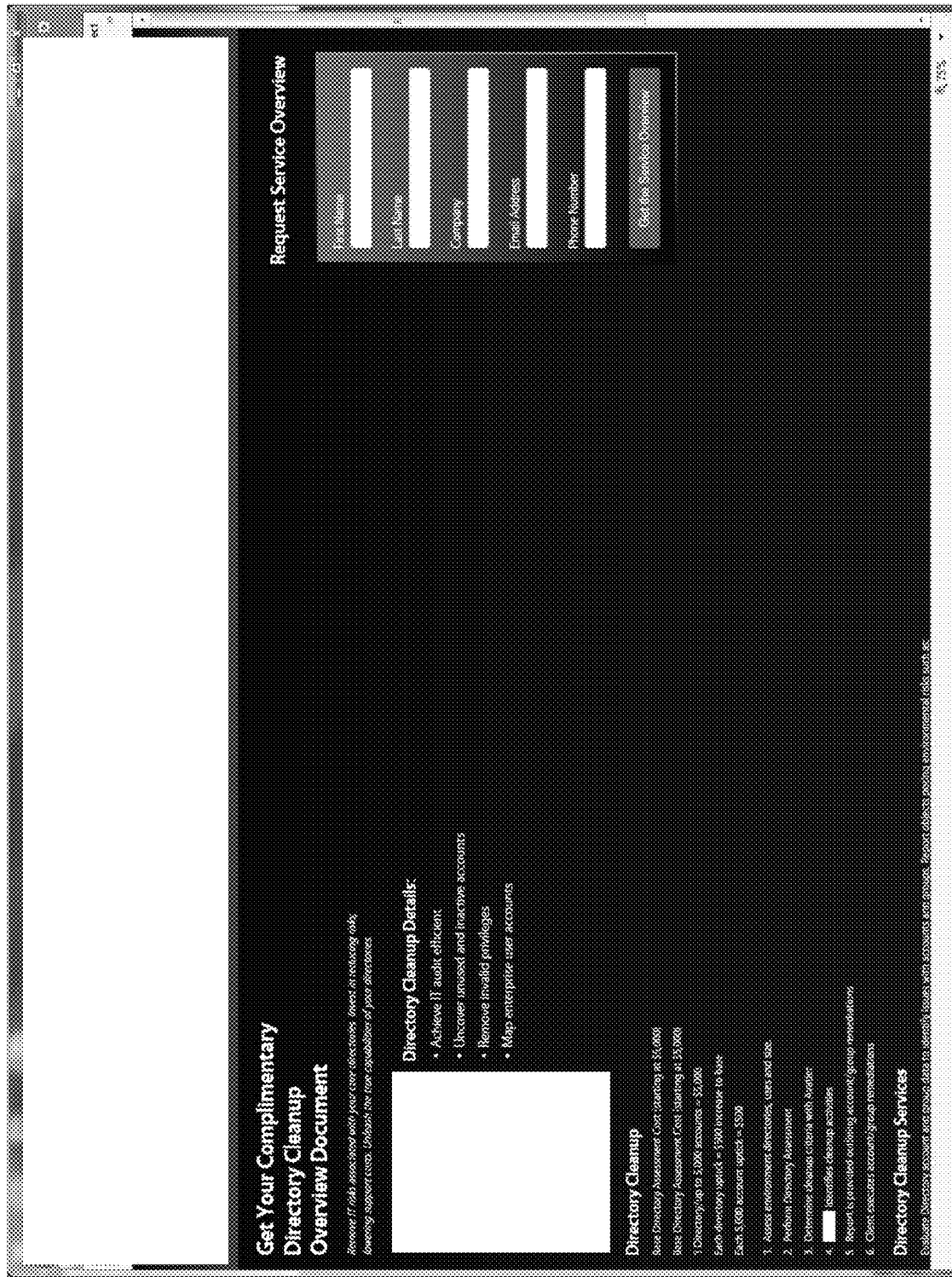
Figure 18D:
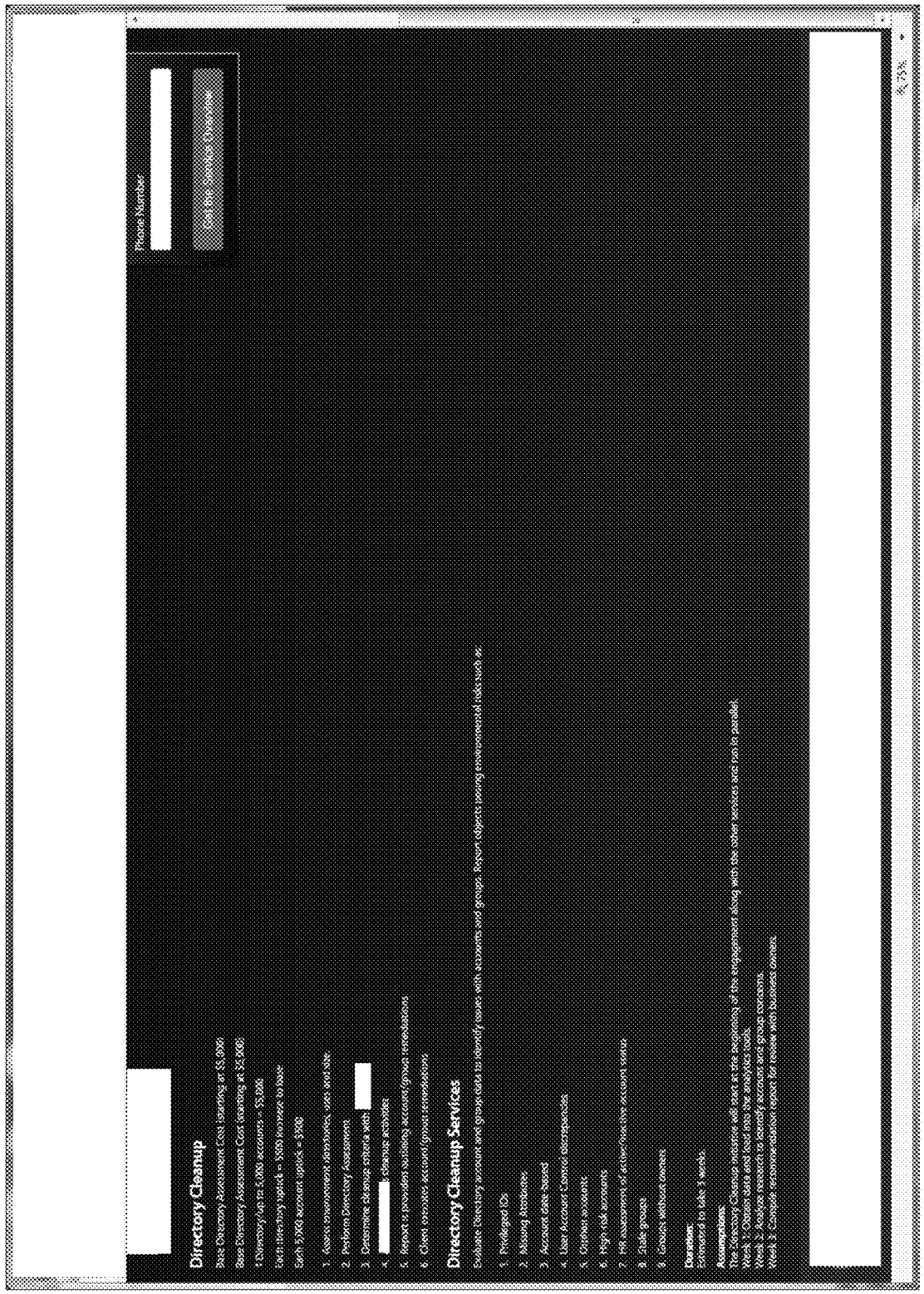
Figure 18E:
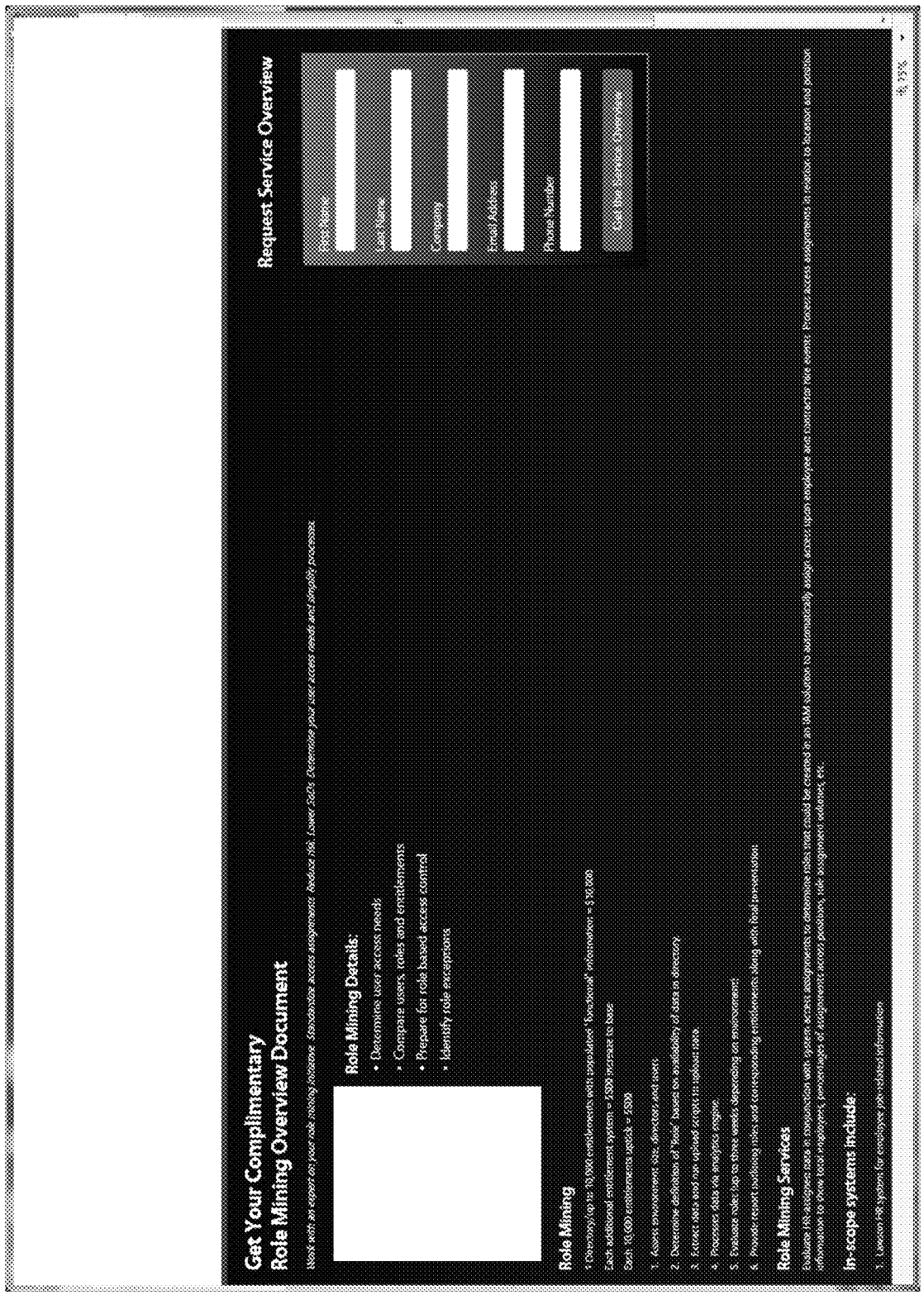
Figure 18F:
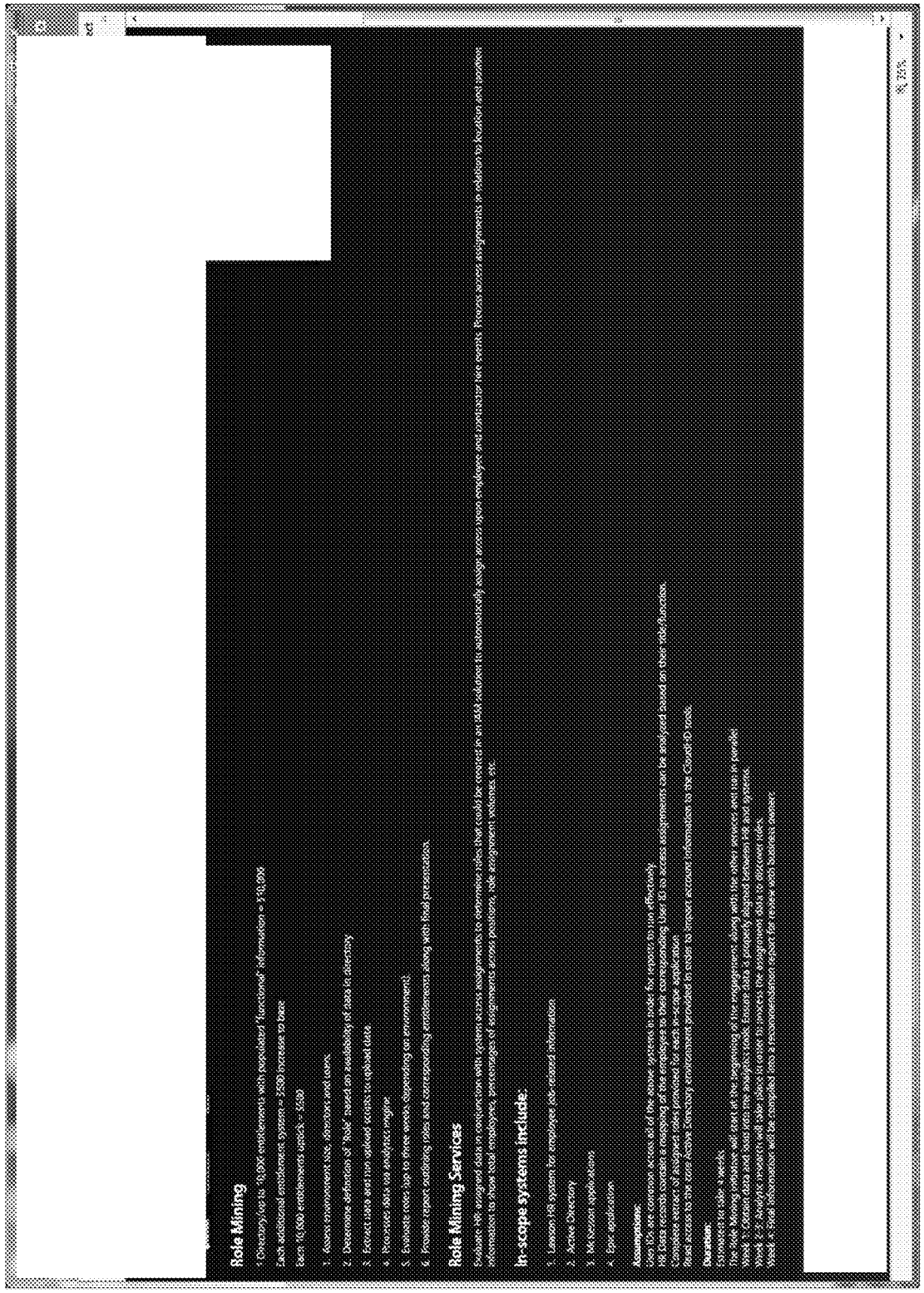
Figure 18G:
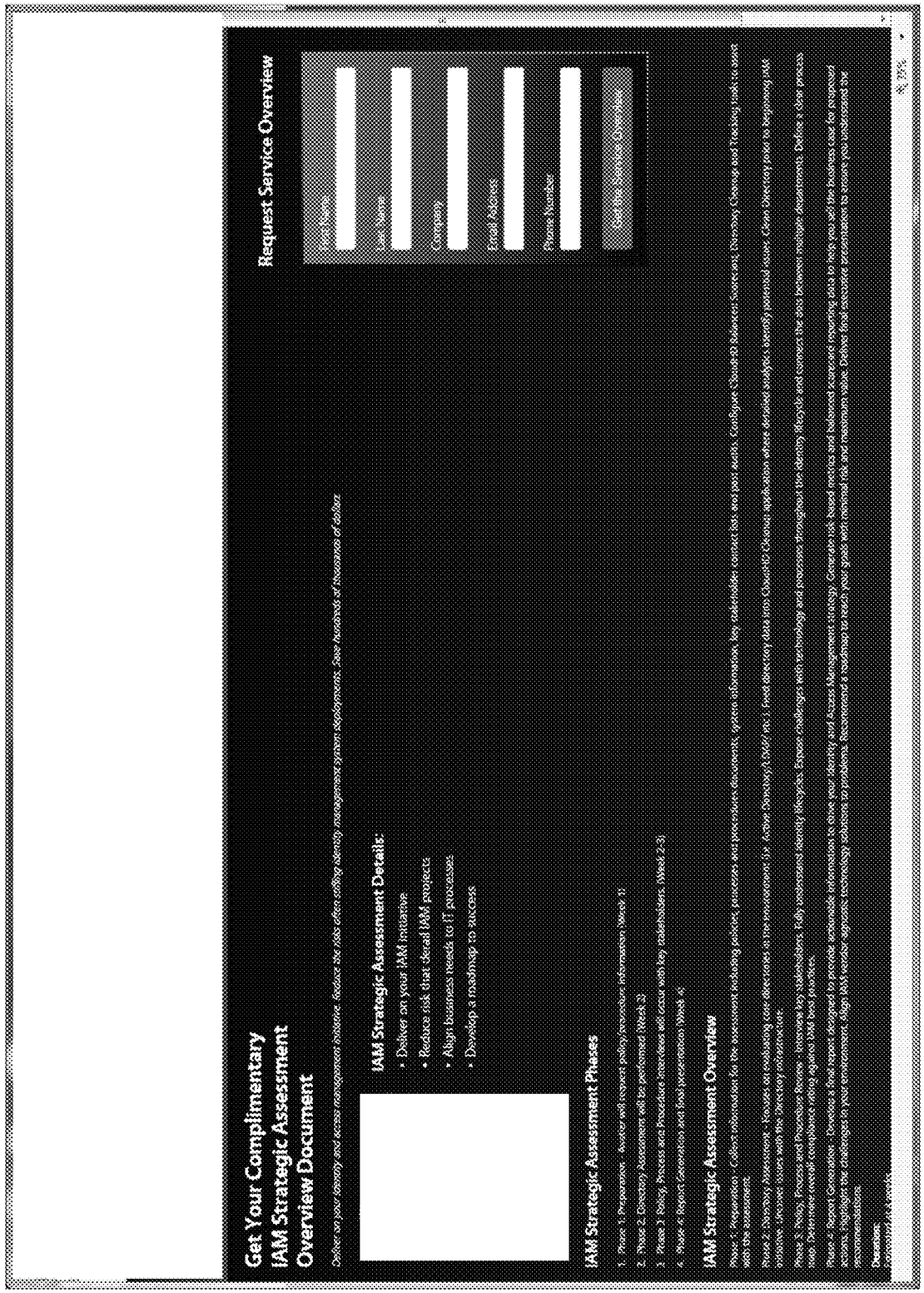
Figure 18H:
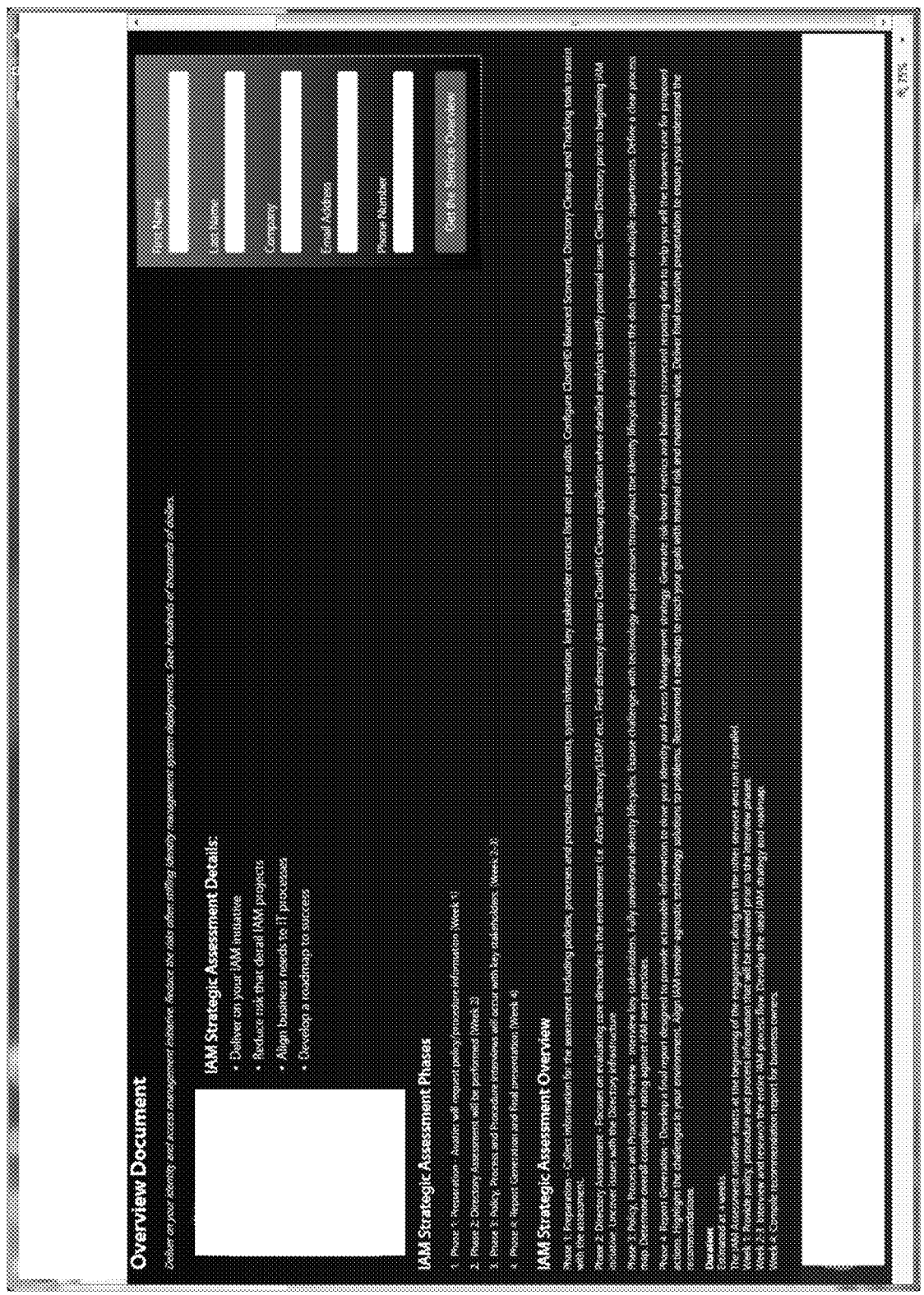
Figure 18I:
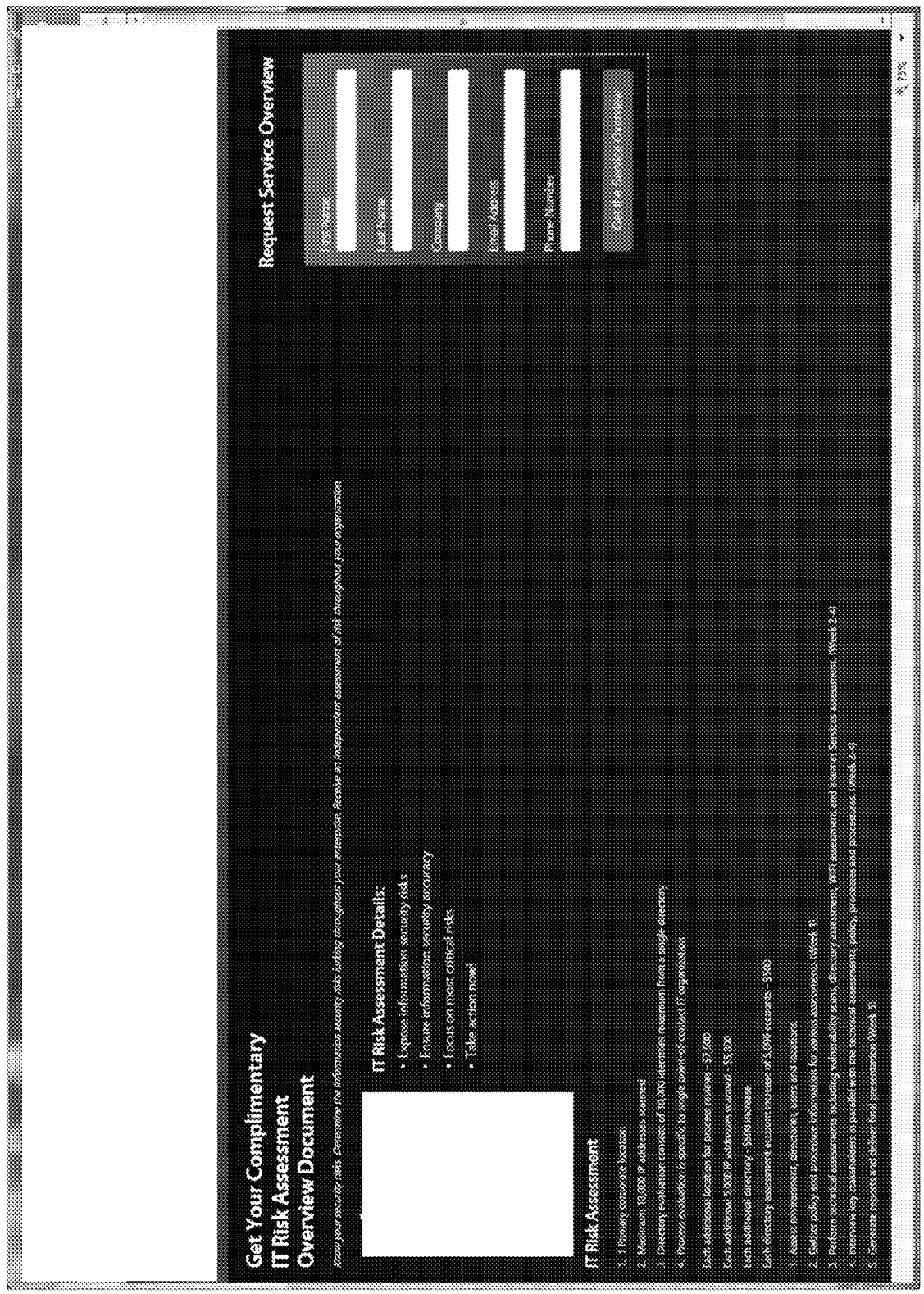
Figure 18J:
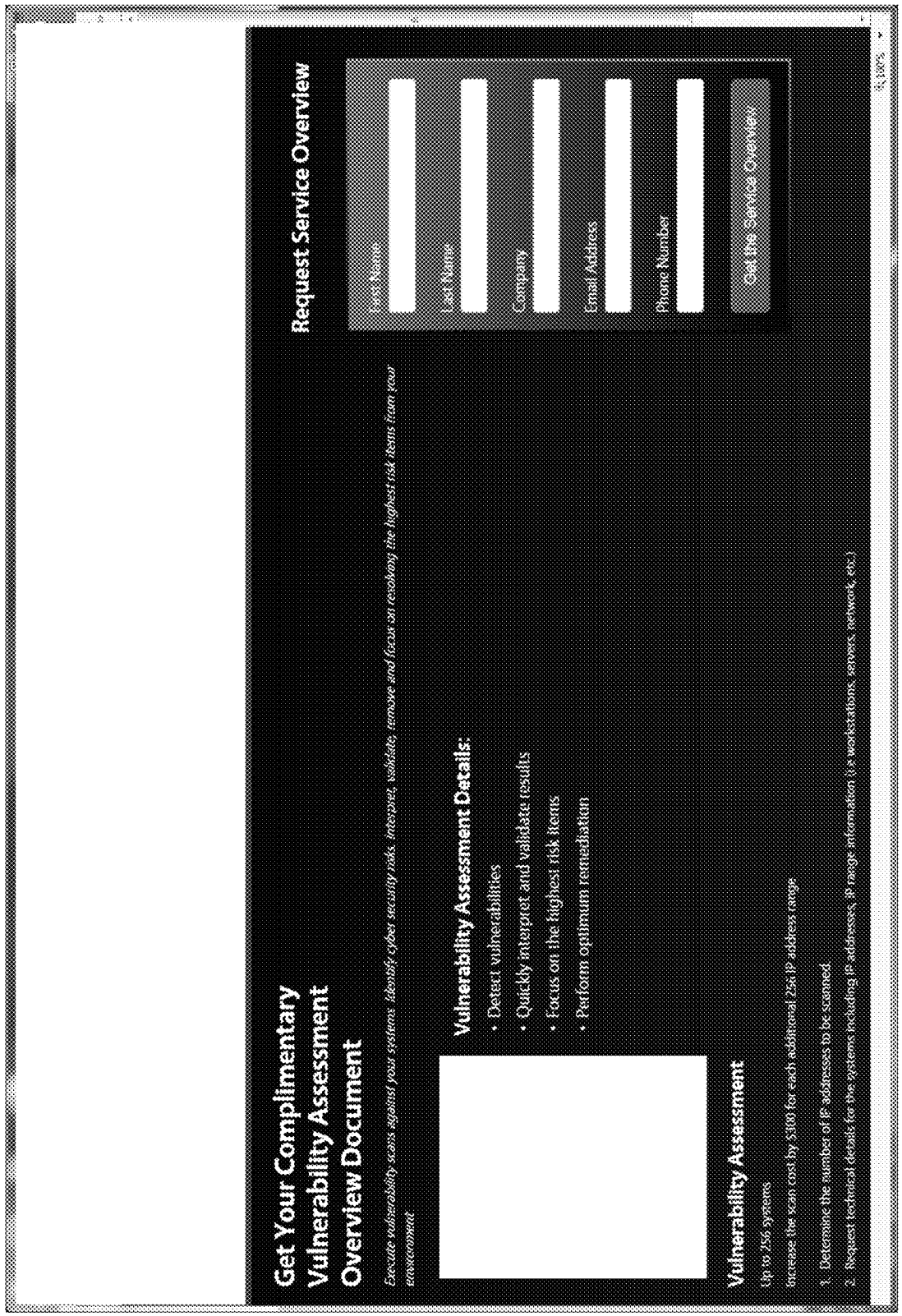
Figure 18K:
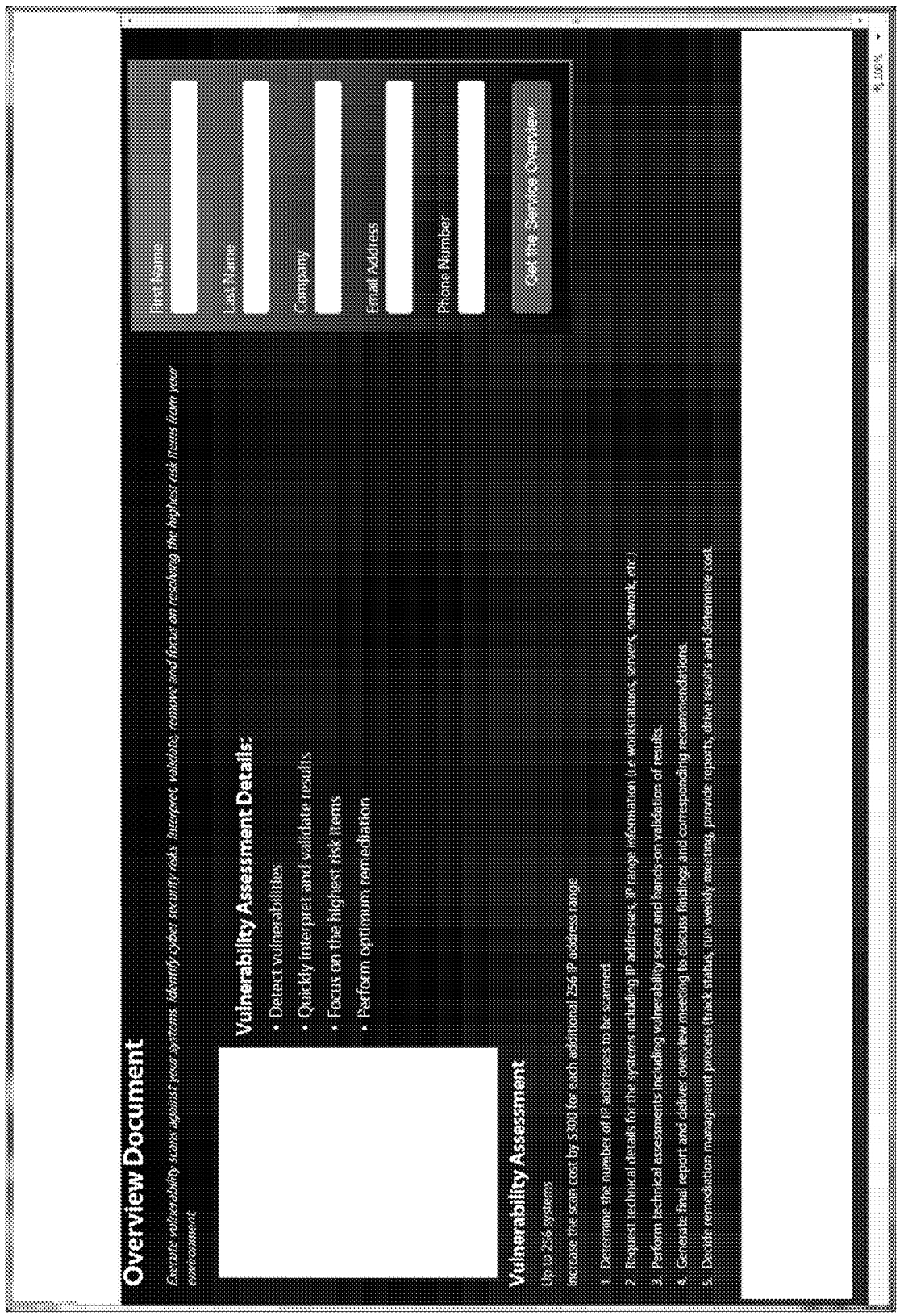

In an embodiment, a service provider can upload images and other data related to the offered service to a service store application interface in the cloud. For example, FIG. 18A shows six services that are offered. While such services can be offered from the same merchant, they can also be offered by different merchants that are independent from one another, yet have their services offered at the same storefront. In an embodiment, templates are provided such that merchants can configure and complete the templates for their service. Service store 1602, upon receiving a completed template from a particular service provider, is configured to communicate with identity engine 1608 and bank module 1610, secure signature module 1612, calendaring module 1614, and others as needed, to assist the service provider in fulfilling the service, when accepted.

In an embodiment, service store 1602 is configured to provide an online cart such that a service consumer can add services to the cart to be purchased at a subsequent time. For example, a user can add a service to apply for a HELOC, a deck repairing service, and a patent application service to a single cart.

In an embodiment, service store 1602 is configured to provide a menu, such as a drop-down menu, that contains the services listed by category. Such menu is user-friendly and make is very simple for a service consumer to start to shop within a particular store or among stores. By way of the menu, the service store is configured to allow a user to easily navigate between services.

In an embodiment, service store 1602 is configured to integrate with smart contracts. That is, from the user's perspective, the contract is already built in. For example, in the HELOC example, service store 1602 is configured to request from identity engine 1608 the most up-to-date identity information about the service consumer. In the embodiment, the aggregated identity is configured to know how many years the service consumer had worked at his or her company and how much was owed on his or her credit cards.

In an embodiment, service store 1602 is configured to integrate with smart scheduling. Again, service store 1602 is configured to request from identity engine 1608 the most up-to-date identity information about the service consumer. For example, the most up-to-date identity information about the service consumer may include that the service consumer is an elementary teacher. Thus, the integrated smart scheduling component 1614, given that the consumer is an elementary school teacher, might know to schedule the loan request after an upcoming raise is expected to be given to all teachers. Or, for a contracting service, smart calendaring 1614 might know that the service consumer's calendar was blacked out on a Friday, but is open on a Monday.

In an embodiment, service store 1602 is configured to send alerts to interested parties, such as the service consumer or the service provider. For example, service store 1602 can send to the service consumer via a service provider a notification a half an hour before the meeting that they need to meet in that hour. The integrated technology can be SMS paging technology, email alerting, smart phone alerting, etc. With this technology, the two parties can continue to communicate until the meeting time and place is confirmed. Thus, service store 1602 is configured to enable immediate feedback regarding decisions pertaining to a particular service.

Thus, using service store 1602, service companies can conduct business like popular product stores, e.g. Amazon.com (Amazon.com, Inc. or its affiliates, Seattle, Wash.) or the Apple App Store (iOS) (Apple Inc., Cupertino, Calif.). In an embodiment, no programming is required for a service provider to set up his or her store. Service store 1602 is configured to provide a wizard interface coupled to appropriate templates so that the service provider can add his or her services.

In an embodiment, the service provider can upload his or her contract to secure signature module 1612, e.g. DocuSign, which is integrated with service store 1602 such that the electronic signatures are integrated.

In an embodiment, each service is associated with an identity ("ID") created by service store 1602. Such IDs are stored in identity engine 1608.

Service store 1602 is configured such that service providers can start putting their services online. With the single sign-on capability described above, the system 1602 is configured such that once a user is logged in to service store 1602, the user can go to anywhere (e.g., LinkedIn, Facebook, wherever) with that log on ID. Thus, in an embodiment, a service of a service provider can be stored in the cloud, configured in such a way for a user open and begin to use on whatever platform the user is on. In contrast, current cloud applications, such as Google, Amazon, eBay, are legacy cloud application, meaning, they are not designed for a user to pull them up, e.g. while driving in a suitable car and be able to touch and use with minimal user interfaces or through a Google Glass, or through a mobile device. Such applications are antiquated web applications.

In an embodiment, the services are configured in accordance with responsive web design. Responsive web design (RWD) is an approach to web design which includes enabling web pages to render well on a variety of devices and window or screen sizes. For example, a particular service can be configured to change format depending on the type of device on which it is being rendered, such as automatically enable touch or enable the things that the device needs to be responsive to whoever it is or whatever application is viewing that site. Thus, service store 1602 is configured to give users a framework from which they can load applications that are responsive in design and will morph or change dynamically to fit the environment that it's going into, whether it be a mobile device, a tablet, or PC or maybe eventually Google Glasses. That is, service store 1602 is configured to recognize the target environment and then format its presentation and the tools available for that environment. Therefore, the innovation ensures that the service provider is not required to perform much computer programming to create such applications.

The innovation described herein allows people to build these stores for services which are different in terms of how one sells and presents a service and how one offers service because services have more variables typically because the services are unique typically in each case for each individual. Using the individual's aggregated IDs from identity engine 1608 also allows the services presented to be tailored. If a service provider is a contractor or an architect or an offeror of any kind of service, the projects typically are all a bit different. This innovation is an improvement over a product store, because services are not products sitting in a warehouse. Services are custom. For example, there's a lot of customization with software. The innovation solves the problem of presenting a custom service in a way that is easy to monetize, is easy to schedule, is easy to quote, is easy to obtain electronic contracts and signatures, and so on.

An example implementation is a patent application service. In this example, service store 1602 is configured to facilitate the following scenario: a client wants to do business with a patent attorney at an all-services law firm; the client may want to meet with patent attorneys at the firm, so the client needs to schedule some time; the patent attorneys need to let the client know what kind of services are available so that the client can pick the service in which they are interested; the law firm has particular problems with clearing conflicts so service store 1602 has the ability to present a form to the client where the client can describe the products so that the law firm can clear conflicts ahead of time. In this particular scenario, there are confidentiality issues and possibly others that can go in to establishing the relationship between the law firm and the client. Thus, service store 1602 can be configured to determine what kind of services are needed and the required scheduling. Service store 1602 can schedule the meeting as well as provide examples of what the costs would be so that the service consumer would understand what that is. Service store 1602 integrates all such considerations into a simple user interface.

In an embodiment, calendaring 1614 component is built in the cloud and can integrate with other established, existing calendar programs, e.g. Outlook or Google calendar.

An embodiment can be understood with reference to the following table. Table A is a table of pseudo code for creating an IT Security Consulting store as shown in FIGS. 18A-K.

TABLE A

| (ITSecurityConsulting) |
|---|

- /
  - Full-text search.
  - Display results as:
    - Large Tiles (default)
    - Small Tiles (no descriptions)
    - Rows
- /admin/dashboard/
  - Shows general stats and action items depending on admin's permissions.
- /admin/data/services/families/
  - One page to view, add, edit, and remove all service roles.
- /admin/data/services/new/
  - Add a new service to the database.
  - Need to select 1 or more service providers who will be notified when service is purchased.

| Name | Data Type | Notes |
|---|---|---|
| title_short | VARCHAR(30) | Unique<br>Search results and service page. |
| title_meta | VARCHAR(70) | Service page meta title. |
| title_long | VARCHAR(100) | Service page <title> |

TABLE A-continued (ITSecurityConsulting)

| | | | |
|---|---|---|---|
| | url | VARCHAR(30) | Unique Example: directory-cleanup |
| | description_short | VARCHAR(75) | Search results and <h2> on service page. |
| | description_meta | VARCHAR(160) | Service page meta description. |
| | description_long | TEXT | HTML Used either HTML5 compliant WYSIWYG or DaringFireball. |
| | keywords_meta | VARCHAR(200) | Service page meta keywords. |
| | price_usd | NUMERIC(10, 2) | The base price is always in USD. Other currencies are converted in shopping cart and stored via session/cookie. |
| | price_increment | TINYINT | UNSIGNED 0 = starting at, 1 = hour, 2 = day, 3 = week, 4 = month, 5 = year |
| | price_algorithm | TINYINT | 0 = none, 1 = first algorithm, 2 = second algorithm, 3 = . . . |
| | price_algorithm_data | TEXT | Contains JSON of the pricing algorithm parameters, if any. |
| | family_name . . . | BIT | 0 = false, 1 = true There will be one column for each family name. |
| | icon | VARCHAR(1000) | JSON data containing the icon styling. |
| | image | VARCHAR(1000) | JSON data containing the image styling. |
| | active | BIT | 0 = false, 1 = true |

- /admin/data/services/providers/
  - One page to view, add, and edit the names and contact details of all service providers.
  - Status (active|inactive). Alerts when attempting to change the status of a service provider if the affected services no longer have any associated service providers, (e.g., each [active] service must have at least 1 provider otherwise the service cannot be fulfilled).
- /admin/data/services/roles/
  - One page to view, add, edit, and remove all service roles.
- /admin/data/services/service/
  - Edit or delete the service.
  - Stats: views, baskets, checkouts, purchases, etc.
- /admin/data/services/tasks/
  - One page to view, add, edit, and remove all service tasks.
- /admin/login/
- /admin/logout/
- /admin/support/customers/
- /admin/support/customers/customer/
- /admin/support/customers/customer/transactions/
- /cart/
  - Displays items currently in the user's shopping cart.
  - Ability to change the quantity of each item, delete the item, or return to the service page and revise the service specifications (e.g., number of installations, locations, etc.).
- /cart/add/
  - Users from /services/SERVICENAME/ that completed the Add to Shopping Cart form are received here for processing and then redirected to /cart/.

TABLE A-continued (ITSecurityConsulting)

- /cart/checkout/
  - Customized agreement in scrolldown div, requires checkbox.
  - Invoice summary.
  - Credit card form.
- /cart/checkout/confirmation/
  - Processes the checkout data and either redirect with error/alerts, or completes the transaction.
    - Send 3$^{rd}$-party scheduler to the buyer.
    - Send to the buyer:
      - PDF Invoice
      - PDF Agreement with signed name in script.
      - Link to schedule their service (3$^{rd}$-party cobrand/white label).
    - Send details of service to the correct service providers.
- /families/
  - Shows list of service families.
  - Each family links to /FAMILYNAME/
    - Uses rewriterule so the homepage is really being loaded, but with "...WHERE 'family_name' = 1..." clause in search query.
- /roles/
  - Shows list of service families.
  - Each family links to /ROLENAME/
    - Uses rewriterule so the homepage is really being loaded, but with "...WHERE 'role_name' = 1..." clause in search query.
- /services/
  - 301 redirect to the homepage.
- /services/SERVICENAME/
  - Description and image of the service.
  - Add to Shopping Cart Form
    - if(price_algorithm == 0)
      - Show default request a price quote form.
    - else
      - Display the corresponding price algorithm from the library.
      - All modifications to the form are stored in the database as JSON with the user's corresponding cookie/session ID.
- /tasks/
  - Shows list of service tasks.
  - Each family links to /TASKNAME/
    - Uses rewriterule so the homepage is really being loaded, but with "...WHERE 'task_name' = 1..." clause in search query.

Exemplary Embodiments

A computer-implemented method, apparatus, and non-transitory computer-readable storage medium having stored thereon a computer program comprising a program code for performing, when the computer program is executed on a computer or processor, for the service store are provided. The embodiments may include displaying, by a service store, on a graphical user interface, a plurality of icons, each icon representing a service of a plurality of services, each service having been added previously by a third-party service provider independent of the service store; receiving, at the service store, a request for a particular service, the request originating from a selection of a particular icon from the plurality of icons and comprising identity information about a consumer of the service; querying, by the service store, a sSSO aggregated identity engine for the additional information about the consumer, where the query comprises parameters reflecting the identity of the consumer and does not contain a username or password associated with the consumer, the query further comprising parameters to find a matching identity within a database of the sSSO aggregated identity engine; receiving, at the service store from the sSSO aggregated identity engine, the additional information about the consumer; responsive to receiving the additional information about the consumer and based on the additional information, building a customized query for a third-party secure signature service, the customized query built using in part the additional information about the consumer; responsive to receiving the additional information about the consumer and based on the additional information, building a customized query for a third-party calendaring service, the customized query built using in part the additional information about the consumer; responsive to receiving the additional information about the consumer and based on the additional information, building a customized query for a third-party banking service, the customized query built using in part the additional information about the consumer; responsive to receiving query results from the third-party secure signature service, causing a contract to be signed by the consumer and the third-party service provider independent of the service store; responsive to receiving query results from the third-party calendaring service, causing a schedule for the particular service to be generated and distributed to the consumer and the third-party service provider independent of the service store; and responsive to receiving query results from the third-party banking service, causing a payment channel between the consumer and the third-party service provider independent of the service store to be generated for the fulfillment of the particular service. The embodiments further may include wherein the particular service is a building contractor service; wherein the particular service is a legal service; wherein the particular service is an information technology (IT) service; wherein the particular service is a real estate-related service; and wherein the particular service is a debt-related service.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method comprising:
    displaying, by a service store, on a graphical user interface, a plurality of icons, each icon representing a service of a plurality of services, each service having been added previously by a third-party service provider independent of the service store;
    receiving, at the service store, a request for a particular service, the request originating from a selection of a particular icon from the plurality of icons and comprising identity information about a consumer of the service;
    querying, by the service store, a sSSO aggregated identity engine for the additional information about the consumer, where the query comprises parameters reflecting the identity of the consumer and does not contain a username or password associated with the consumer, the query further comprising parameters to find a matching identity within a database of the sSSO aggregated identity engine;
    receiving, at the service store from the sSSO aggregated identity engine, the additional information about the consumer;
    responsive to receiving the additional information about the consumer and based on the additional information, building and deploying, by the service store, a customized query for a third-party secure signature service, the customized query built using in part the additional information about the consumer;
    responsive to receiving the additional information about the consumer and based on the additional information, building and deploying, by the service store, a customized query for a third-party calendaring service, the customized query built using in part the additional information about the consumer;
    responsive to receiving the additional information about the consumer and based on the additional information, building and deploying, by the service store, a customized query for a third-party banking service, the customized query built using in part the additional information about the consumer;
    responsive to receiving query results from the third-party secure signature service, causing a contract to be signed by the consumer and the third-party service provider independent of the service store;
    responsive to receiving query results from the third-party calendaring service, causing a schedule for the particular service to be generated and distributed to the consumer and the third-party service provider independent of the service store; and
    responsive to receiving query results from the third-party banking service, causing a payment channel between the consumer and the third-party service provider independent of the service store to be generated for the fulfillment of the particular service;
    wherein one or more steps are performed on at least a processor coupled to at least a memory.

2. The method of claim 1, wherein the particular service is a building contractor service.

3. The method of claim 1, wherein the particular service is a legal service.

4. The method of claim 1, wherein the particular service is an information technology (IT) service.

5. The method of claim 1, wherein the particular service is a real estate-related service.

6. The method of claim 1, wherein the particular service is a debt-related service.

7. The method of claim 1, further comprising:
    prior to the service store displaying the plurality of icons, receiving, at the service store, a request to open a session of the service store and to display the plurality of icons, the request from the sSSO aggregated identity engine and originating by the consumer.

8. An apparatus comprising:
    a processor operable to execute computer program instructions; and
    a memory operable to store computer program instructions executable by the processor, for performing:
    displaying, by a service store, on a graphical user interface, a plurality of icons, each icon representing a service of a plurality of services, each service having been added previously by a third-party service provider independent of the service store;
    receiving, at the service store, a request for a particular service, the request originating from a selection of a particular icon from the plurality of icons and comprising identity information about a consumer of the service;
    querying, by the service store, a sSSO aggregated identity engine for the additional information about the consumer, where the query comprises parameters reflecting the identity of the consumer and does not contain a username or password associated with the consumer, the query further comprising parameters to find a matching identity within a database of the sSSO aggregated identity engine;
    receiving, at the service store from the sSSO aggregated identity engine, the additional information about the consumer;
    responsive to receiving the additional information about the consumer and based on the additional information, building and deploying, by the service store, a customized query for a third-party secure signature service, the customized query built using in part the additional information about the consumer;
    responsive to receiving the additional information about the consumer and based on the additional information, building and deploying, by the service store, a customized query for a third-party calendaring service, the customized query built using in part the additional information about the consumer;
    responsive to receiving the additional information about the consumer and based on the additional information, building and deploying, by the service store, a customized query for a third-party banking service, the customized query built using in part the additional information about the consumer;
    responsive to receiving query results from the third-party secure signature service, causing a contract to be signed by the consumer and the third-party service provider independent of the service store;
    responsive to receiving query results from the third-party calendaring service, causing a schedule for the particular service to be generated and distributed to the consumer and the third-party service provider independent of the service store; and
    responsive to receiving query results from the third-party banking service, causing a payment channel between the consumer and the third-party service provider independent of the service store to be generated for the fulfillment of the particular service.

9. The apparatus of claim 8, wherein the particular service is a building contractor service.

10. The apparatus of claim 8, wherein the particular service is a legal service.

11. The apparatus of claim 8, wherein the particular service is an information technology (IT) service.

12. The apparatus of claim 8, wherein the particular service is a real estate-related service.

13. The apparatus of claim 8, wherein the particular service is a debt-related service.

14. The apparatus of claim 8, wherein the computer program instructions further comprises:
   prior to the service store displaying the plurality of icons, receiving, at the service store, a request to open a session of the service store and to display the plurality of icons, the request from the sSSO aggregated identity engine and originating by the consumer.

15. A non-transitory computer-readable storage medium having stored thereon a computer program comprising a program code for performing, when the computer program is executed on a computer or processor, a method comprising:
   displaying, by a service store, on a graphical user interface, a plurality of icons, each icon representing a service of a plurality of services, each service having been added previously by a third-party service provider independent of the service store;
   receiving, at the service store, a request for a particular service, the request originating from a selection of a particular icon from the plurality of icons and comprising identity information about a consumer of the service;
   querying, by the service store, a sSSO aggregated identity engine for the additional information about the consumer, where the query comprises parameters reflecting the identity of the consumer and does not contain a username or password associated with the consumer, the query further comprising parameters to find a matching identity within a database of the sSSO aggregated identity engine;
   receiving, at the service store from the sSSO aggregated identity engine, the additional information about the consumer;
   responsive to receiving the additional information about the consumer and based on the additional information, building and deploying, by the service store, a customized query for a third-party secure signature service, the customized query built using in part the additional information about the consumer;
   responsive to receiving the additional information about the consumer and based on the additional information, building and deploying, by the service store, a customized query for a third-party calendaring service, the customized query built using in part the additional information about the consumer;
   responsive to receiving the additional information about the consumer and based on the additional information, building and deploying, by the service store, a customized query for a third-party banking service, the customized query built using in part the additional information about the consumer;
   responsive to receiving query results from the third-party secure signature service, causing a contract to be signed by the consumer and the third-party service provider independent of the service store;
   responsive to receiving query results from the third-party calendaring service, causing a schedule for the particular service to be generated and distributed to the consumer and the third-party service provider independent of the service store; and
   responsive to receiving query results from the third-party banking service, causing a payment channel between the consumer and the third-party service provider independent of the service store to be generated for the fulfillment of the particular service.

16. The non-transitory computer-readable storage medium of claim 15, wherein the particular service is a building contractor service.

17. The non-transitory computer-readable storage medium of claim 15, wherein the particular service is a legal service.

18. The non-transitory computer-readable storage medium of claim 15, wherein the particular service is an information technology (IT) service.

19. The non-transitory computer-readable storage medium of claim 15, wherein the particular service is a debt-related service.

20. The non-transitory computer-readable storage medium of claim 15, wherein the computer program code further comprises:
   prior to the service store displaying the plurality of icons, receiving, at the service store, a request to open a session of the service store and to display the plurality of icons, the request from the sSSO aggregated identity engine and originating by the consumer.

\* \* \* \* \*